United States Patent
Yang et al.

(10) Patent No.: US 10,158,849 B2
(45) Date of Patent: Dec. 18, 2018

(54) PROJECTION APPARATUS

(71) Applicant: DELTA ELECTRONICS, INC., Taoyuan (TW)

(72) Inventors: Chung-Yi Yang, Taoyuan (TW); Bor Wang, Taoyuan (TW); Yu-Cheng Lin, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 356 days.

(21) Appl. No.: 14/993,063

(22) Filed: Jan. 11, 2016

(65) Prior Publication Data
US 2016/0337639 A1   Nov. 17, 2016

(30) Foreign Application Priority Data
May 12, 2015 (TW) .............................. 104114977 A

(51) Int. Cl.
H04N 9/31 (2006.01)
H04N 13/398 (2018.01)
H04N 13/341 (2018.01)

(52) U.S. Cl.
CPC ......... *H04N 13/398* (2018.05); *H04N 13/341* (2018.05)

(58) Field of Classification Search
CPC ....... H04N 1/32154; H04N 2201/3233; H04N 1/32288; H04N 2201/3226; H04N 1/32352; H04N 1/3216; H04N 2201/3225; H04N 13/0497; H04N 13/0438; H04N 13/0459; G06T 2201/005; G06T 2201/00
See application file for complete search history.

(56) References Cited

U.S. PATENT DOCUMENTS

| | | | | |
|---|---|---|---|---|
| 9,736,442 | B1 * | 8/2017 | Wong | H04N 9/3188 |
| 2003/0090597 | A1 * | 5/2003 | Katoh | H04N 9/3111 348/744 |
| 2008/0068372 | A1 * | 3/2008 | Krah | H04N 13/363 345/419 |
| 2008/0151040 | A1 * | 6/2008 | Kim | H04N 13/341 348/42 |
| 2010/0128107 | A1 | 5/2010 | Tomita | |
| 2013/0215235 | A1 * | 8/2013 | Russell | G03B 35/00 348/47 |
| 2013/0300948 | A1 | 11/2013 | Jannard et al. | |

(Continued)

FOREIGN PATENT DOCUMENTS

| | | | |
|---|---|---|---|
| CN | 101742346 A | 6/2010 | |
| CN | 104272728 A | 1/2015 | |

*Primary Examiner* — Sathyanaraya V Perungavoor
*Assistant Examiner* — Howard D Brown, Jr.
(74) *Attorney, Agent, or Firm* — CKC & Partners Co., Ltd.

(57) ABSTRACT

A projection apparatus includes an image control device, a display device, and an image shift device. The image control device is configured to generate a plurality of left-eye sub-image data according to a left-eye image data and generate a plurality of right-eye sub-image data according to a right-eye image data. The display device is configured to sequentially display a plurality of left-eye images and right-eye images according to the left-eye sub-image data and the right-eye sub-image data. The image shift device is configured to shift the left-eye sub-images from each other and shift the right-eye sub-images from each other.

20 Claims, 17 Drawing Sheets

(56) References Cited

U.S. PATENT DOCUMENTS

| | | | |
|---|---|---|---|
| 2014/0168393 A1* | 6/2014 | Fang | H04N 13/341 348/58 |
| 2015/0042895 A1 | 2/2015 | Jannard et al. | |
| 2016/0029001 A1 | 1/2016 | Jannard et al. | |
| 2016/0337639 A1* | 11/2016 | Yang | H04N 13/341 |
| 2016/0366381 A1 | 12/2016 | Jannard et al. | |

* cited by examiner

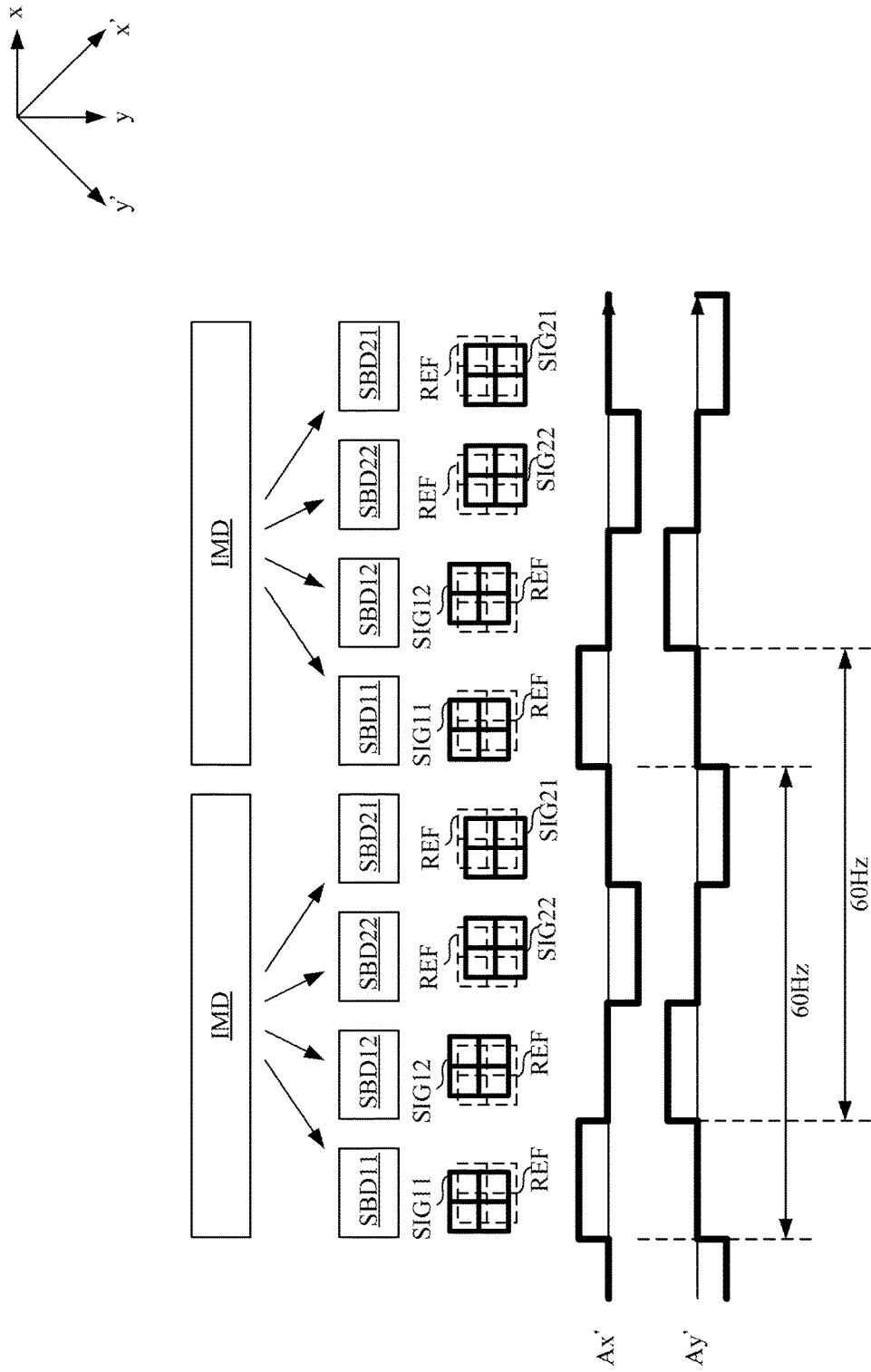

PROJECTION APPARATUS

RELATED APPLICATIONS

This application claims priority to Taiwan Application Serial Number 104114977, filed May 12, 2015, which is herein incorporated by reference.

BACKGROUND

Technical Field

The present disclosure relates to an electronic apparatus. More particularly, the present disclosure relates to a projection apparatus.

Description of Related Art

With advances in technology, projection apparatuses have been widely used.

A typical projection apparatus may include a digital micromirror device (DMD). The projection apparatus may receive an image data, generate a projection image, and project the projection image by utilizing the DMD. However, due to cost and benefit considerations, limitations in the resolution of the DMD are encountered. Thus, even with the reception of image data having a high resolution, the resolution of the projection image is still limited due to the resolution of the DMD. As a result, the number of different types of applications for the projection apparatus is restricted.

SUMMARY

One aspect of the present disclosure is related to a 3D projection apparatus. In accordance with one embodiment of the present disclosure, the 3D projection apparatus includes an image control device, a display device, a projection device, and an image shift device. The image control device is configured to generate a plurality of left-eye sub-image data according to a left-eye image data and generate a plurality of right-eye sub-image data according to a right-eye image data. The display device is configured to sequentially receive the plurality of left-eye sub-image data and the plurality of right-eye sub-image data, and sequentially display a plurality of left-eye sub-images and a plurality of right-eye sub-images according to the left-eye sub-image data and the right-eye sub-image data respectively. The projection device is configured to project the plurality of left-eye sub-images and the plurality of right-eye sub-images onto a projection screen. The image shift device is configured to shift the left-eye sub-images from each other and shift the right-eye sub-images from each other on the projection screen. The shifted left-eye sub-images form a left-eye combined image on the projection screen. The shifted right-eye sub-images form a right-eye combined image on the projection screen. A resolution of the left-eye combined image is greater than resolutions of the left-eye sub-images, and a resolution of the right-eye combined image is greater than resolutions of the right-eye sub-images.

Another aspect of the present disclosure relates to a 3D projection apparatus. In accordance with one embodiment of the present disclosure, the 3D projection apparatus includes an image control device, a display device, a projection device, and an image shift device. The image control device is configured to generate a first left-eye sub-image data and a second left-eye sub-image data according to a left-eye image data, and generate a first right-eye sub-image data and a second right-eye sub-image data according to a right-eye image data. The first left-eye sub-image data and the second left-eye sub-image data are different from each other, and the first right-eye sub-image data and the second right-eye sub-image data are different from each other. The display device is configured to sequentially display a first left-eye sub-image, a second left-eye sub-image, a first right-eye sub-image, and a second right-eye sub-image according to the first left-eye sub-image data, the second left-eye sub-image data, the first right-eye sub-image data, and the second right-eye sub-image data respectively. The projection device configured to project the first left-eye sub-image, the second left-eye sub-image, the first right-eye sub-image, and the second right-eye sub-image onto a projection screen. The image shift device is configured to shift the first left-eye sub-image to a first position, shift the second left-eye sub-image to a second position, shift the first right-eye sub-image to a third position, and shift the second right-eye sub-image to a fourth position on the projection screen. The first position, the second position, the third position, and the fourth position are different from each other.

Another aspect of the present disclosure relates to a projection apparatus. In accordance with one embodiment of the present disclosure, the 3D projection apparatus includes an image control device, a display device, a projection device, and an image shift device. The image control device is configured to generate a plurality of sub-image data different from each other according to an image data. The image data includes a plurality of pixel data, each of a plurality of adjacent pixel data of the pixel data are grouped as a pixel group, each of the sub-image data includes one of the pixel data in the pixel groups. The display device is configured to sequentially receive the sub-image data, and sequentially display a plurality of sub-images. The projection device is configured to project the plurality of sub-images onto a projection screen. The image shift device is configured to shift the sub-images from each other on the projection screen. The shifted sub-images form a combined image on the projection screen, and a resolution of the combined image is greater than resolutions of the sub-images.

Through utilizing an application of one embodiment described above, the projection apparatus can simulate an image with a high resolution even when hardware in the projection apparatus only supports a resolution lower than that achieved with the image.

BRIEF DESCRIPTION OF THE DRAWINGS

The invention can be more fully understood by reading the following detailed description of the embodiments, with reference made to the accompanying drawings as follows:

FIG. 5C illustrates a diagram used to describe shifting sub-images in accordance with one embodiment of the present disclosure.

DETAILED DESCRIPTION

Figure 1:
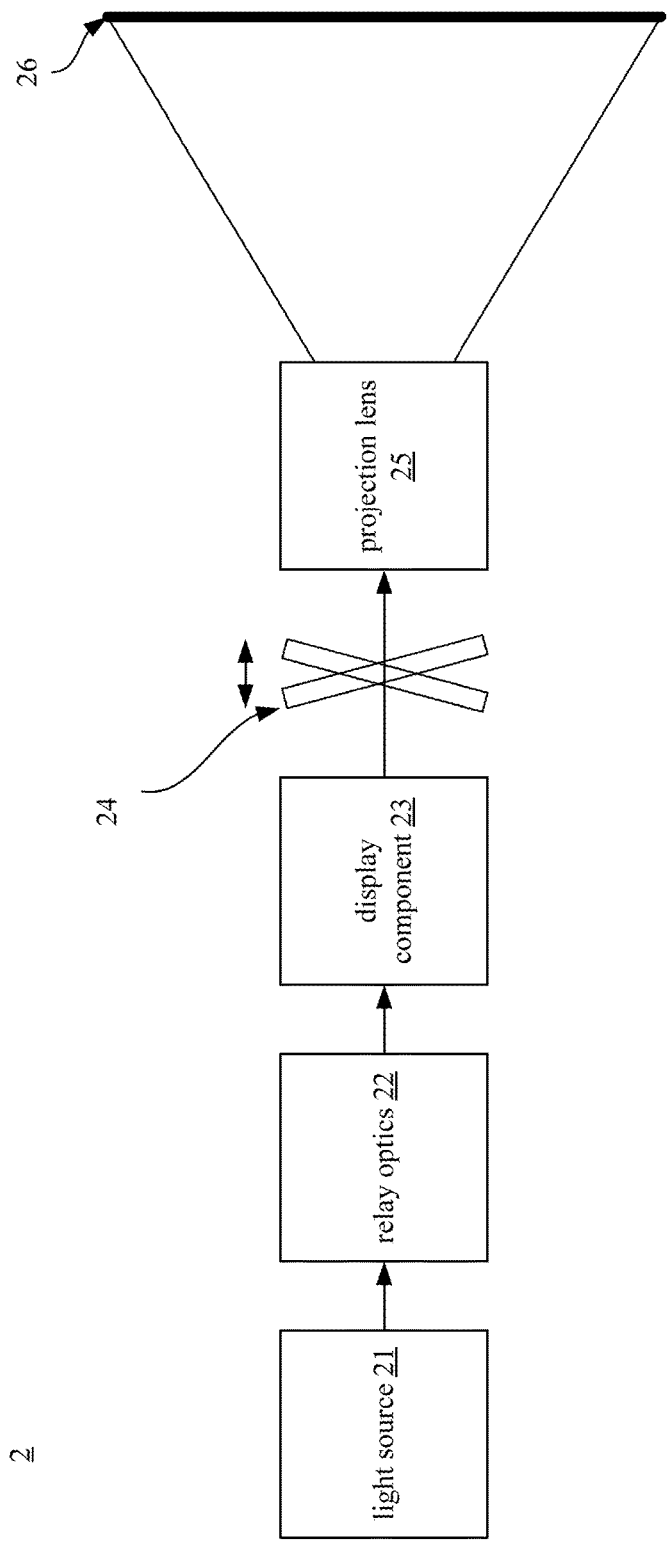
FIG. 1 is a schematic diagram of a projection apparatus in accordance with one embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

It will be understood that, in the description herein and throughout the claims that follow, although the terms "first," "second," etc. may be used to describe various elements, these elements should not be limited by these terms. These terms are only used to distinguish one element from another. For example, a first element could be termed a second element, and, similarly, a second element could be termed a first element, without departing from the scope of the embodiments.

It will be understood that, in the description herein and throughout the claims that follow, the terms "comprise" or "comprising," "include" or "including," "have" or "having," "contain" or "containing" and the like used herein are to be understood to be open-ended, i.e., to mean including but not limited to.

It will be understood that, in the description herein and throughout the claims that follow, the range of error to the values modified by the term "substantially" is generally 20%, and it can be 10% in some preferred cases, and moreover, it can also be 5% in some most preferred cases.

It will be understood that, in the description herein and throughout the claims that follow, words indicating direction used in the description of the following embodiments, such as "above," "below," "left," "right," "front" and "back," are directions as they relate to the accompanying drawings. Therefore, such words indicating direction are used for illustration and do not limit the present disclosure.

It will be understood that, in the description herein and throughout the claims that follow, the phrase "and/or" includes any and all combinations of one or more of the associated listed items.

It will be understood that, in the description herein and throughout the claims that follow, unless otherwise defined, all terms (including technical and scientific terms) have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any element in a claim that does not explicitly state "means for" performing a specified function, or "step for" performing a specific function, is not to be interpreted as a "means" or "step" clause as specified in 35 U.S.C. § 112(f). In particular, the use of "step of" in the claims herein is not intended to invoke the provisions of 35 U.S.C. § 112(f).

FIG. 1 is a schematic diagram of a projection apparatus 2 in accordance with one embodiment of the present disclosure. In this embodiment, the projection apparatus 2 includes a light source 21, relay optics 22, a display component 23, an image shift device 24, a projection lens 25, and a projection screen 26. The light source 21 may generate light beams. The light beams form an original image via the relay optics 22 and are transmitted to the display component 23. The display component 23 can be used to modulate the light beams. The modulated light beams pass through the projection lens 25 and project on the projection screen 26 to display a projection image.

In this embodiment, the relay optics 22 can be used to lead the light beams generated by the light source 21 to the display component 23. The display component 23 controls and modulates the received light beams to generate modulated light beams. The image shift device 24 is used to shift the modulated light beams to different positions of the projection lens 25. The projection lens 25 is used to receive the shifted light beams from the image shift device 24 and project the shifted light beams to the projection screen 26 to form the projection image.

By shifting the modulated light beams to different positions of the projection lens 25, so that the positions of the modulated light beams on the projection screen 26 are shifted to be different, the resolution of the projection image displayed on the projection screen 26 (e.g., 3840*2160) can be greater than the highest support resolution of the display component 23 (e.g., 1920*1080).

In the paragraphs below, details of the present disclosure are provided with reference to FIG. 2.

Figure 2:
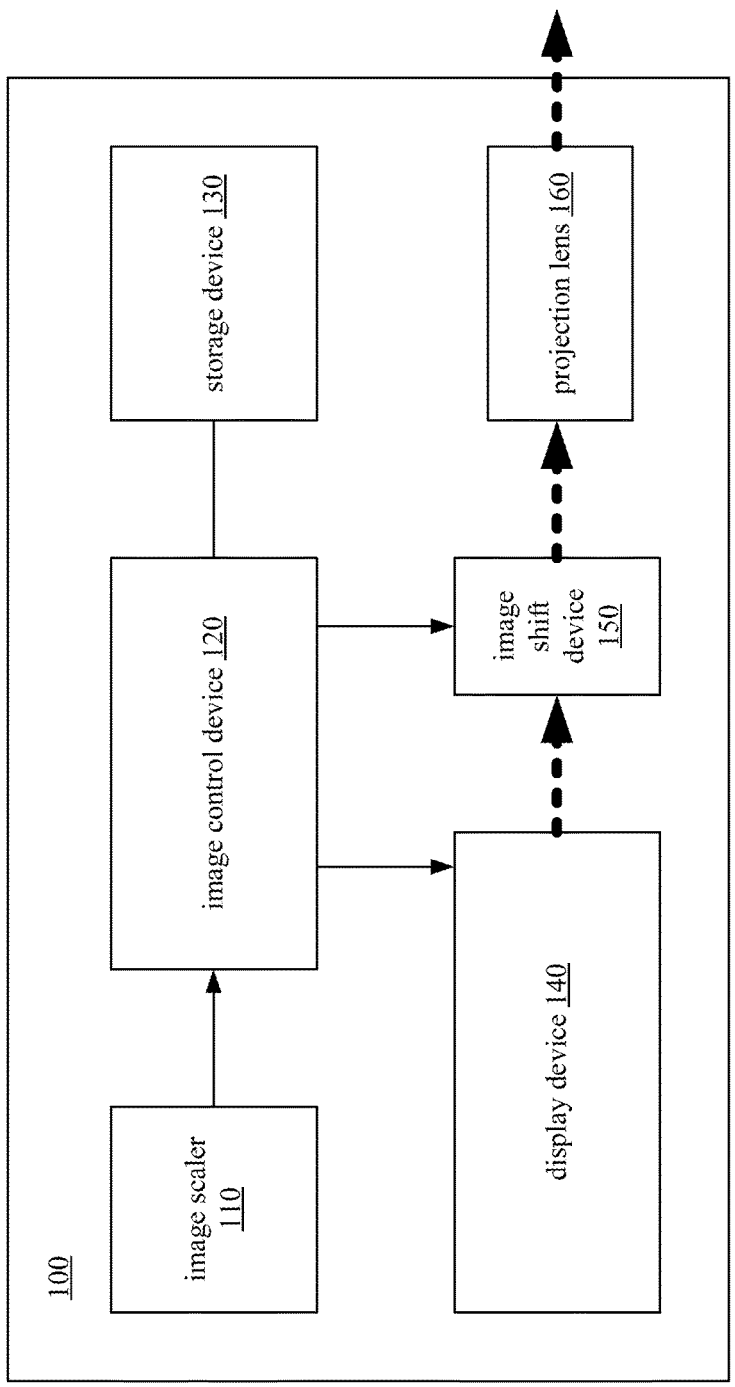
FIG. 2 is a schematic diagram of a projection apparatus in accordance with one embodiment of the present disclosure.

FIG. 2 is a schematic diagram of a projection apparatus 100 in accordance with one embodiment of the present disclosure. In this embodiment, the projection apparatus 100 includes an image scaler 110, an image control device 120, a storage device 130, a display device 140, an image shift device 150, and a projection lens 160.

In this embodiment, the image control device 120 is electrically connected to the image scaler 110, the storage device 130, the display device 140, and the image shift device 150. In this embodiment, the image scaler 110 may be realized by using a video scaler integrated chip, or a field-programmable gate array (FPGA). The image control device 120 may be realized by using, for example, a central processor (CPU), a microprocessor, a programmable logic device (PLD), a field-programmable gate array (FPGA) or another suitable processing component. The storage device 130 can be realized by, for example, a disk, a memory, or a portable storage media, or another suitable storage component. The display device 140 can be realized by, for example, the light source 21 and the display component 23 shown in FIG. 1, but is not limited in this regard. The image shift device 150 and the projection lens 160 can be realized by, for example, the image shift device 24 and the projection lens 25 shown in FIG. 1, respectively, but are not limited in this regard.

In this embodiment, the image scaler 110 is configured to receive an original image data, and process the original image data to generate an image data with a fixed resolution. In one embodiment, the resolution of the image data is determined corresponding to the resolution of the display device 140.

For example, under a condition that the resolution of the display device 140 is equal to 1920*1080, if the original image data received by the image scaler 110 is equal to 800*600, the image scaler 110 magnifies the original image data to generate an image data with a resolution equal to 3840*2160 (i.e., two times the resolution of the display device 140). Under the same condition, if the original image data received by the image scaler 110 is equal to 7680*4320, the image scaler 110 shrinks the original image data to generate an image data with a resolution equal to 3840*2160.

In this embodiment, the image control device 120 is configured to receive the image data from the image scaler 110, and generate a plurality of sub-image data according to the image data. In one embodiment, the resolutions of the sub-image data are smaller than the resolution of the image data. In one embodiment, the resolutions of the sub-image data are equal to the resolution of the display device 140.

To facilitate the description to follow, operative examples in FIG. 3A and FIG. 3B will be described in the following paragraphs for illustrating the generation of the sub-image data.

Figure 3A:
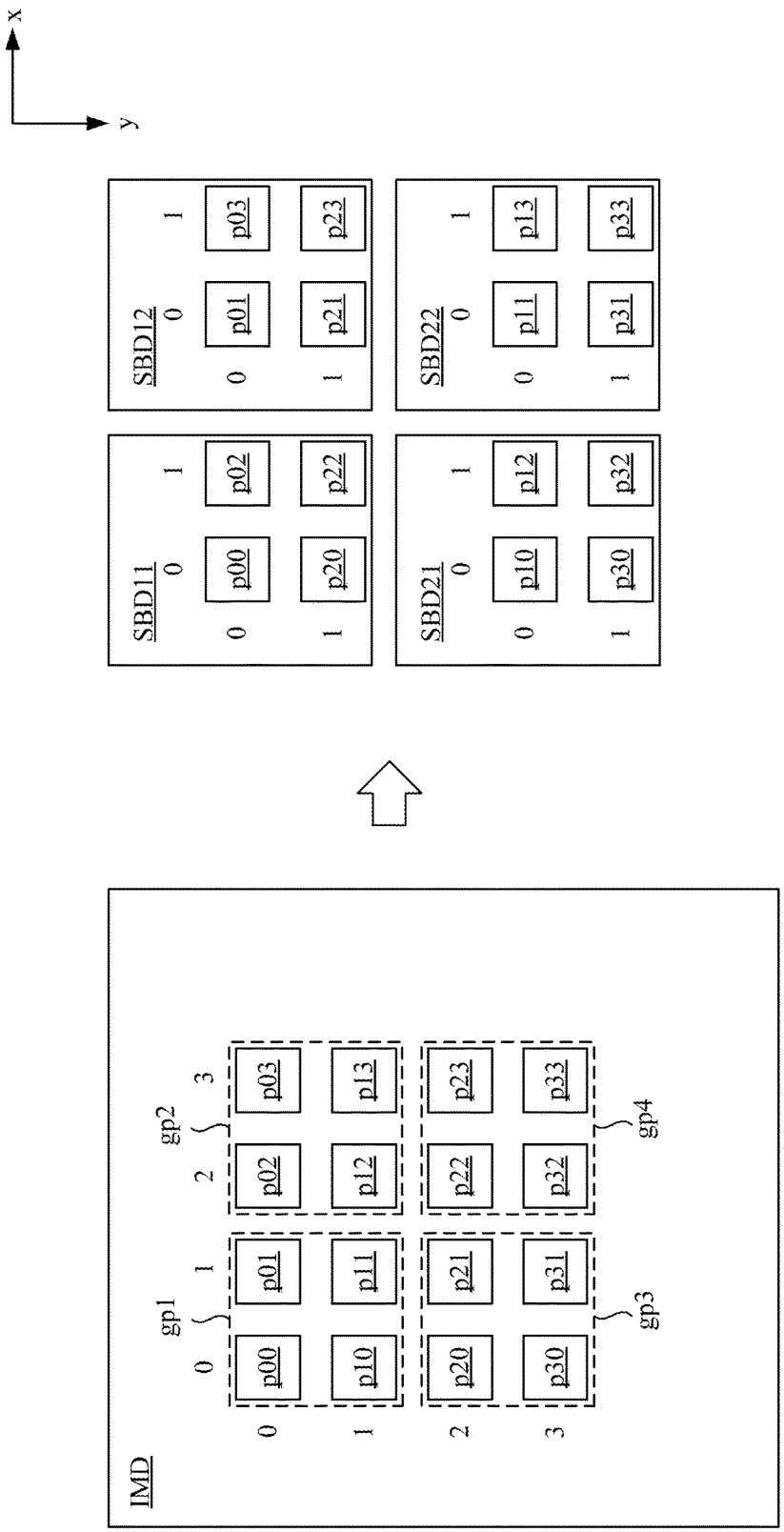
FIG. 3A illustrates a diagram used to describe generating sub-image data in accordance with one embodiment of the present disclosure.

Particular reference is made first to FIG. 3A. In this example, the resolution of the image data IMD is 4*4, and the image data IMD includes 16 pixel data p00-p33. The pixel data p00, p01, p02, p03, . . . , p33 are respectively located at pixel positions (0, 0), (0, 1), (0, 2), (0, 3), . . . , (3, 3). A plurality of (e.g., 4) adjacent pixel data of the pixel data p00-p33 are grouped as a pixel group. For example, the pixel data p00, p01, p10, and p11 can be grouped as a pixel group gp1; the pixel data p02, p03, p12, and p13 can be grouped as a pixel group gp2; the pixel data p20, p21, p30, and p31 can be grouped as a pixel group gp3; and the pixel data p22, p23, p32, and p33 can be grouped as a pixel group gp4.

In addition to grouping the image data IMD into a plurality of pixel groups, the image control device 120 may further process the image data IMD to generate a plurality of sub-image data. In this embodiment, each of the sub-image data generated by the image control device 120 may include one pixel data of each of the pixel groups gp1-gp4.

For example, sub-image data SBD11 may include pixel data p00, p02, p20, p22 located at a top-left position (e.g., pixel positions (0, 0), (0, 2), (2, 0), (2, 2)) of each of the pixel groups gp1-gp4. Sub-image data SBD12 may include pixel data p01, p03, p21, p23 located at a top-right position (e.g., pixel positions (0, 1), (0, 3), (2, 1), (2, 3)) of each of the pixel groups gp1-gp4. Sub-image data SBD21 may include pixel data p10, p12, p30, p32 located at a bottom-left position (e.g., pixel positions (1, 0), (1, 2), (3, 0), (3, 2)) of each of the pixel groups gp1-gp4. Sub-image data SBD22 may include pixel data p11, p13, p31, p33 located at a bottom-right position (e.g., pixel positions (1, 1), (1, 3), (3, 1), (3, 3)) of each of the pixel groups gp1-gp4. In one embodiment, the top-left position and the top-right position of each of the pixel groups gp1-gp4 are adjacent in the x direction, the top-right position and the bottom-right position of each of the pixel groups gp1-gp4 are adjacent in the y direction, and the top-left position and the bottom-left position of each of the pixel groups gp1-gp4 are adjacent in the y direction. The top-left position and the bottom-right position of each of the pixel groups gp1-gp4 are located diagonally opposite to each other, and the bottom-left position and the top-right position of each of the pixel groups gp1-gp4 are located diagonally opposite to each other.

Figure 3B:
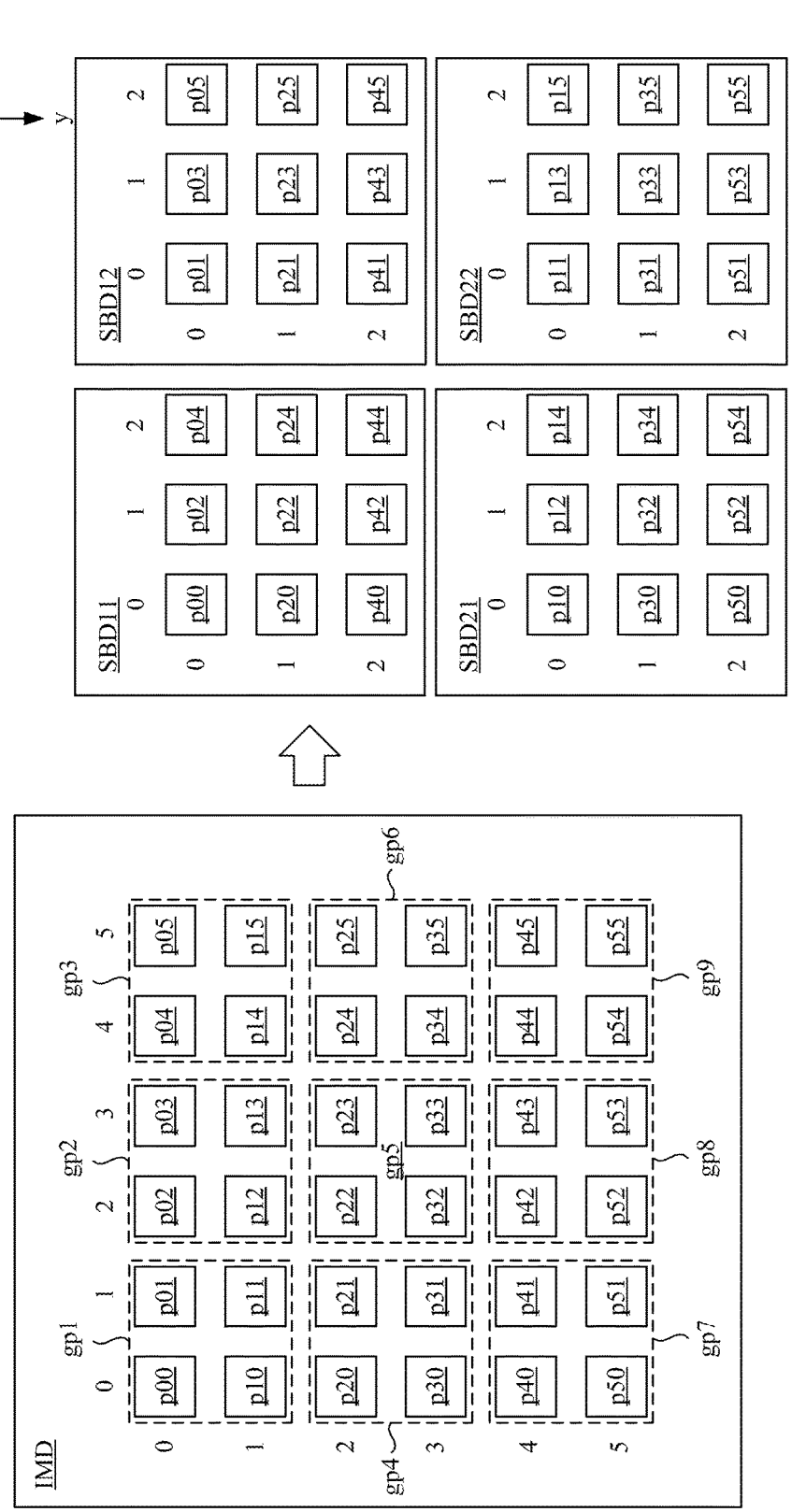
FIG. 3B illustrates a diagram used to describe generating sub-image data in accordance with one embodiment of the present disclosure.

Particular reference is made to FIG. 3B. In this example, the resolution of the image data IMD is 6*6, and the image data IMD includes 36 pixel data p00-p55. The pixel data p00-p55 are respectively located at pixel positions (0, 0)-(5, 5). A plurality of (e.g., 4) adjacent pixel data of the pixel data p00-p55 are grouped as a pixel group. For example, the pixel data p00, p01, p10, and p11 can be grouped as a pixel group gp1; the pixel data p02, p03, p12, and p13 can be grouped as a pixel group gp2; the pixel data p04, p05, p14, and p15 can be grouped as a pixel group gp3; the pixel data p20, p21, p30, and p31 can be grouped as a pixel group gp4; the pixel data p22, p23, p32, and p33 can be grouped as a pixel group gp5; the pixel data p24, p25, p34, and p35 can be grouped as a pixel group gp6; the pixel data p40, p41, p50, and p51 can be grouped as a pixel group gp7; the pixel data p42, p43, p52, and p53 can be grouped as a pixel group gp8; and the pixel data p44, p45, p54, p55 can be grouped as a pixel group gp9.

In addition to grouping the image data IMD into a plurality of pixel groups, the image control device 120 may further process the image data IMD to generate a plurality of sub-image data. In this embodiment, each of the sub-image data generated by the image control device 120 may include one pixel data of each of the pixel groups gp1-gp9.

For example, sub-image data SBD11 may include pixel data p00, p02, p04, p20, p22, p24, p40, p42, p44 located at a top-left position (e.g., pixel positions (0, 0), (0, 2), (0, 4), (2, 0), (2, 2), (2, 4), (4, 0), (4, 2), (4, 4)) of each of the pixel groups gp1-gp9. Sub-image data SBD12 may include pixel data p01, p03, p05, p21, p23, p25, p41, p43, p45 located at a top-right position (e.g., pixel positions (0, 1), (0, 3), (0, 5), (2, 1), (2, 3), (2, 5), (4, 1), (4, 3), (4, 5)) of each of the pixel groups gp1-gp9. Sub-image data SBD21 may include pixel data p10, p12, p14, p30, p32, p34, p50, p52, p54 located at a bottom-left position (e.g., pixel positions (1, 0), (1, 2), (1, 4), (3, 0), (3, 2), (3, 4), (5, 0), (5, 2), (5, 4)) of each of the pixel groups gp1-gp9. Sub-image data SBD22 may include pixel data p11, p13, p15, p31, p33, p35, p51, p53, p55 located at a bottom-right position (e.g., pixel positions (1, 1), (1, 3), (1, 5), (3, 1), (3, 3), (3, 5), (5, 1), (5, 3), (5, 5)) of each of the pixel groups gp1-gp9. In one embodiment, the top-left position and the top-right position of each of the pixel groups gp1-gp9 are adjacent in the x direction, the top-right position and the bottom-right position of each of the pixel groups gp1-gp9 are adjacent in the y direction, and the top-left position and the bottom-left position of each of the pixel groups gp1-gp9 are adjacent in the y direction. The top-left position and the bottom-right position of each of the pixel groups gp1-gp9 are located diagonally opposite to each other, and the bottom-left position and the top-right position of each of the pixel groups gp1-gp9 are located diagonally opposite to each other.

It should be noted that the examples in FIGS. 3A and 3B are merely given for illustrative purposes, and the resolution of the image data IMD can be varied on the basis of actual requirements, and the present disclosure is not limited to the embodiments described above. Moreover, in some embodiments, the image control device 120 may selectively generate some of the sub-image data SBD11-SBD22, instead of generating all of the sub-image data SBD11-SBD22.

After the sub-image data are generated, the image control device 120 is configured to sequentially provide the sub-image data to the display device 140, so that the display device 140 is able to sequentially display a plurality of sub-images according to the sub-image data. In the display of the sub-images by the display device 140, the image control device 120 also provides control signals to the image shift device 150, so that the image shift device 150 shifts the sub-images generated by the display device 140 from each other according to the control signals.

In one embodiment, the image shift device 150 may be a single-axis image shift device. The image control device 120 can provide one control signal to the image shift device 150 to make the image shift device 150 shift the sub-images to two different positions. In another embodiment, the image shift device 150 may be a two-axis image shift device. The image control device 120 can provide two control signals (one controls a horizontal shift, another one controls a vertical shift) to the image shift device 150 to make the image shift device 150 shift the sub-images to four different positions. It should be noted that the design of the image shift device 150 can be varied on the basis of actual requirements, and the present disclosure is not limited to the embodiments described above.

In the following paragraphs, details of the present disclosure will be provided with reference to the embodiment in FIGS. 4A, and 4B, but the present disclosure is not limited to the embodiment below.

In this embodiment, the image control device 120 may receive the image data IMD with a fundamental frequency (e.g., 60 Hz), and sequentially generate the sub-image data SBD11, SBD22 with two times the fundamental frequency (e.g., 120 Hz). The display device 140 may generate sub-images SIG11, SIG22 with two times the fundamental frequency (e.g., 120 Hz) according to the sub-image data SBD11, SBD22. It should be noted that details of the generation of the sub-image data SBD11, SBD22 can be ascertained with reference to the embodiments shown in FIGS. 3A and 3B, and a description in this regard will not be repeated herein.

In this embodiment, the image control device 120 may provide a diagonal control signal AD (e.g., with a frequency of 60 Hz) to the image shift device 150 to control the image shift device 150 to shift the sub-images SIG11, SIG22 along the diagonal direction d.

In this embodiment, the image shift device 150 shifts the sub-image SIG11 to a first position at a top-left side of a reference position REF and shifts the sub-image SIG22 to a second position at a bottom-right side of the reference position REF according to the diagonal control signal AD.

More particularly, the image shift device 150 may include one or more actuators (not shown). The image shift device 150 moves by utilizing the one or more actuators to shift the sub-image SIG11 to the first position at the top-left side of the reference position REF and shift the sub-image SIG22 to the second position at the bottom-right side of the reference position REF. The first position is shifted from the reference position REF along the −x direction by a length of A/4 and along the −y direction by a length of B/4. The second position is shifted from the reference position REF along the +x direction by a length of A/4 and along the +y direction by a length of B/4. The length A is a length of each of the pixels in the x direction. The length B is a length of each of the pixels in the y direction. In other words, the sub-images SIG11, SIG22 are shifted along the diagonal direction d, and the diagonal direction d can be composed by using an x-direction component and a y-direction component.

In one embodiment, the image shift device 150 moves along the diagonal direction d by using a single actuator to shift the sub-image SIG11 to the first position at the top-left side of the reference position REF and shift the sub-image SIG22 to the second position at the bottom-right side of the reference position REF according to the diagonal control signal AD. In a further embodiment, the image shift device 150 shifts each of the sub-images SIG11, SIG22 each time along the diagonal direction d from the reference position REF by a length of $$\sqrt{\frac{A^2}{16} + \frac{B^2}{16}}.$$

Through the operations described above, the sub-images SIG11, SIG22 can partially overlap to form a combined image CIG with a resolution greater than the resolutions of the sub-images SIG11, SIG22.

Figure 4A:
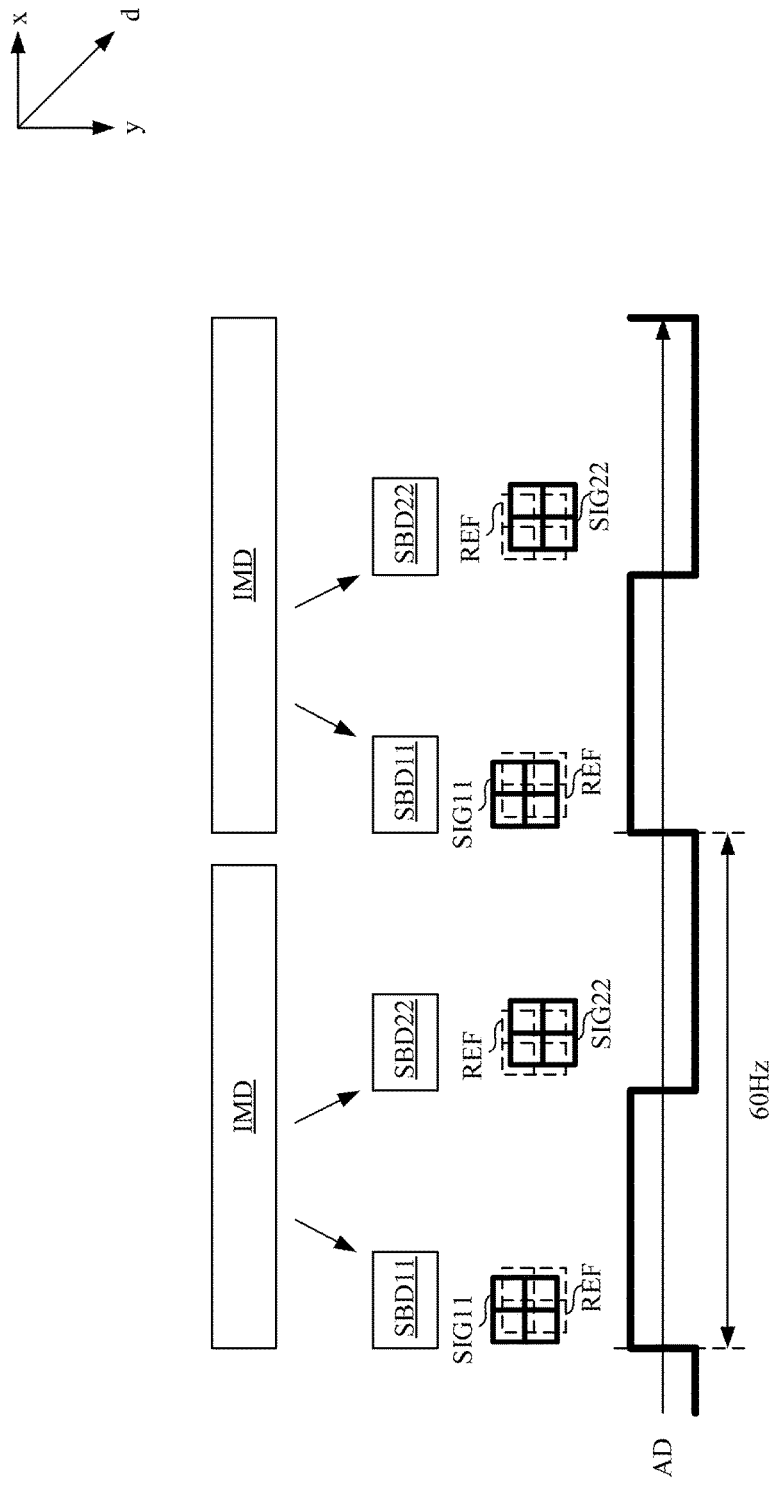
FIG. 4A illustrates a diagram used to describe shifting sub-images in accordance with one embodiment of the present disclosure.
Figure 4B:
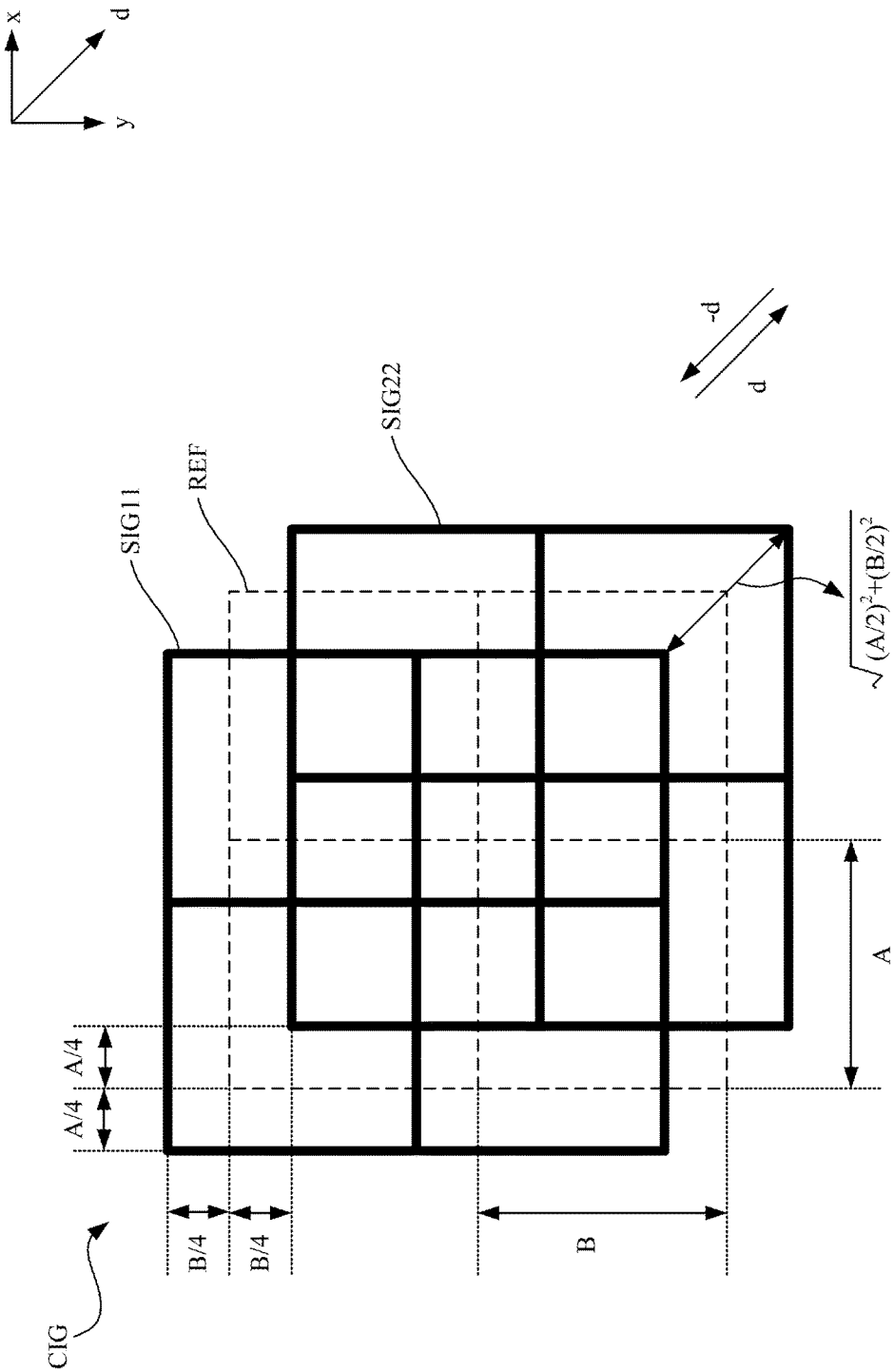
FIG. 4B illustrates a combined image in accordance with one embodiment of the present disclosure.

It should be noted that, in FIGS. 4A and 4B, the resolutions of the sub-images SIG11, SIG22, which are equal to 2*2, are given for illustrative purposes, and the present disclosure is not limited to the embodiments described above. In one embodiment, if the resolution of the image data IMD is equal to 3840*2160, then the resolutions of the sub-image data SBD11, SBD22 and the sub-images SIG11, SIG22 are equal to 1920*1080, and the resolution of the combined image CIG is substantially equal to 3840*2160.

In the following paragraphs, details of the present disclosure will be provided with reference to the embodiment in FIGS. 5A and 5B, but the present disclosure is not limited to the embodiment below.

In this embodiment, the image control device 120 may receive the image data IMD with a fundamental frequency (e.g., 60 Hz), and sequentially generate the sub-image data SBD11, SBD12, SBD22, SBD21 with four times the fundamental frequency (e.g., 240 Hz). The display device 140 may generate sub-images SIG11, SIG12, SIG22, SIG21 with four times the fundamental frequency (e.g., 240 Hz) according to the sub-image data SBD11, SBD12, SBD22, SBD21, sequentially. It should be noted that details of the generation of the sub-image data SBD11, SBD12, SBD22, SBD21 can be ascertained with reference to the embodiments shown in FIGS. 3A and 3B, and a description in this regard will not be repeated herein.

In this embodiment, the image control device 120 may provide an x-direction control signal AH (e.g., with a frequency of 60 Hz) to the image shift device 150 to control the image shift device 150 to shift the sub-images SIG11, SIG12, SIG22, SIG21 along the x direction. In addition, the image control device 120 may provide a y-direction control signal AV (e.g., with a frequency of 60 Hz) to the image shift device 150 to control the image shift device 150 to shift the sub-images SIG11, SIG12, SIG22, SIG21 along the y-direction. In this embodiment, the frequencies of the x-direction control signal AH and the y-direction control signal AV are identical, and the phases of the x-direction control signal AH and the y-direction control signal AV are different (e.g., with a 90-degree difference).

In this embodiment, the image shift device 150 shifts the sub-image SIG11 to a first position at a top-left side of the reference position REF, shifts the sub-image SIG12 to a second position at a top-right side of the reference position REF, shifts the sub-image SIG22 to a third position at a bottom-right side of the reference position REF, and shifts the sub-image SIG21 to a fourth position at a bottom-left side of the reference position REF according to the x-direction control signal AH and the y-direction control signal AV.

More particularly, the image shift device 150 shifts the sub-image SIG11 from the reference position REF along the −x direction by a length of A/4 and along the −y direction by a length of B/4, shifts the sub-image SIG12 from the reference position REF along the +x direction by a length of A/4 and along the −y direction by a length of B/4, shifts the sub-image SIG21 from the reference position REF along the −x direction by a length of A/4 and along the +y direction by a length of B/4, and shifts the sub-image SIG22 from the reference position REF along the +x direction by a length of A/4 and along the +y direction by a length of B/4. The length A is a length of each of the pixels in the x direction. The length B is a length of each of the pixels in the y direction. In one embodiment, the sub-images SIG11, SIG12 are shifted from each other along the x direction, the sub-images SIG12, SIG21 are shifted from each other along the y direction, the sub-images SIG22, SIG21 are shifted from each other along the x direction, and the sub-images SIG21, SIG11 are shifted from each other along the y direction. In other words, the sub-images SIG11, SIG12, SIG22, SIG21 are sequentially displayed and shifted in a clockwise direction.

In the following paragraphs, details of the present disclosure will be provided with reference to the embodiment in FIGS. 5C and 5D, but the present disclosure is not limited to the embodiment below.

In this embodiment, the image control device 120 may receive the image data IMD with a fundamental frequency (e.g., 60 Hz), and sequentially generate the sub-image data SBD11, SBD12, SBD22, SBD21 with four times the fundamental frequency (e.g., 240 Hz). The display device 140 may generate sub-images SIG11, SIG12, SIG22, SIG21 with four times the fundamental frequency (e.g., 240 Hz) according to the sub-image data SBD11, SBD12, SBD22, SBD21, sequentially. It should be noted that details of the generation of the sub-image data SBD11, SBD12, SBD22, SBD21 can be ascertained with reference to the embodiments shown in FIGS. 3A and 3B, and a description in this regard will not be repeated herein.

In this embodiment, the image control device 120 may provide a first diagonal control signal Ax' (e.g., with a frequency of 60 Hz) to the image shift device 150 to control the image shift device 150 to shift the sub-images SIG11, SIG12, SIG22, SIG21 along a first diagonal direction x'. In addition, the image control device 120 may provide a second diagonal control signal Ay' (e.g., with a frequency of 60 Hz) to the image shift device 150 to control the image shift device 150 to shift the sub-images SIG11, SIG12, SIG22, SIG21 along the second diagonal direction y'. In this embodiment, the frequencies of the first diagonal control signal Ax' and the second diagonal control signal Ay' are identical, and the phases of the first diagonal control signal Ax' and second diagonal control signal Ay' are different (e.g., with a 90-degree difference).

In this embodiment, the image shift device 150 shifts the sub-image SIG11 to a first position at a top-left side of the reference position REF, shifts the sub-image SIG12 to a second position at a top-right side of the reference position REF, shifts the sub-image SIG22 to a third position at a bottom-right side of the reference position REF, and shifts the sub-image SIG21 to a fourth position at a bottom-left side of the reference position REF according to the first diagonal control signal Ax' and the second diagonal control signal Ay'.

More particularly, the image shift device 150 shifts the sub-image SIG11 from the reference position REF separately along the −x' direction and the −y' direction by identical lengths of $$\sqrt{\frac{A^2}{16} + \frac{B^2}{16}},$$

shifts the sub-image SIG12 from the reference position REF separately along the +x' direction and the −y' direction by identical lengths of $$\sqrt{\frac{A^2}{16} + \frac{B^2}{16}},$$

shifts the sub-image SIG21 from the reference position REF separately along the −x' direction and the +y' direction by identical lengths of $$\sqrt{\frac{A^2}{16} + \frac{B^2}{16}},$$

and shifts the sub-image SIG22 from the reference position REF separately along the +x' direction and the +y' direction by identical lengths of $$\sqrt{\frac{A^2}{16} + \frac{B^2}{16}}.$$

The length A is a length of each of the pixels in the x direction. The length B is a length of each of the pixels in the y direction. Equivalently, the sub-images SIG11, SIG12 are shifted from each other along the x direction, the sub-images SIG12, SIG21 are shifted from each other along the y direction, the sub-images SIG22, SIG21 are shifted from each other along the x direction, and the sub-images SIG21, SIG11 are shifted from each other along the y direction. In other words, the sub-images SIG11, SIG12, SIG22, SIG21 are sequentially displayed and shifted in a clockwise direction.

Through the operations described above, the sub-images SIG11, SIG12, SIG22, SIG21 can partially overlap to form a combined image CIG with a resolution greater than the resolutions of the sub-images SIG11, SIG12, SIG22, SIG21.

It should be noted that, in FIGS. 5A, 5B, 5C, 5D, the resolutions of the sub-images SIG11, SIG12, SIG22, SIG21, which are equal to 2*2, are given for illustrative purposes, and the present disclosure is not limited to the embodiments described above. In one embodiment, if the resolution of the image data IMD is equal to 3840*2160, then the resolutions of the sub-image data SBD11, SBD12, SBD22, SBD21 and the sub-images SIG11, SIG12, SIG22, SIG21 are equal to 1920*1080, and the resolution of the combined image CIG is substantially equal to 3840*2160.

Additionally, it should be noted that, in this embodiment, the sub-image data SBD11, SBD12, SBD22, SBD21 cooperatively contain all of the pixel data of the image data IMD, so that data loss in the generation of the sub-image data SBD11, SBD12, SBD22, SBD21 can be avoided.

Figure 5A:
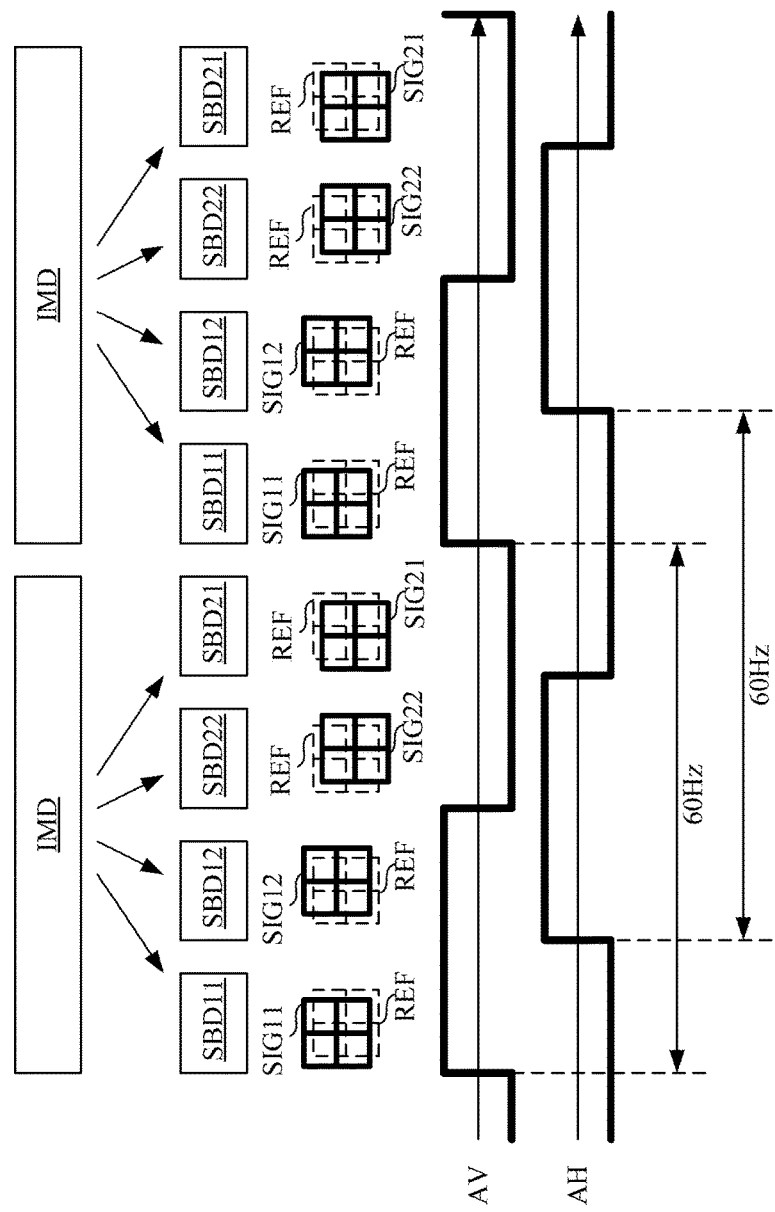
FIG. 5A illustrates a diagram used to describe shifting sub-images in accordance with one embodiment of the present disclosure.
Figure 5B:
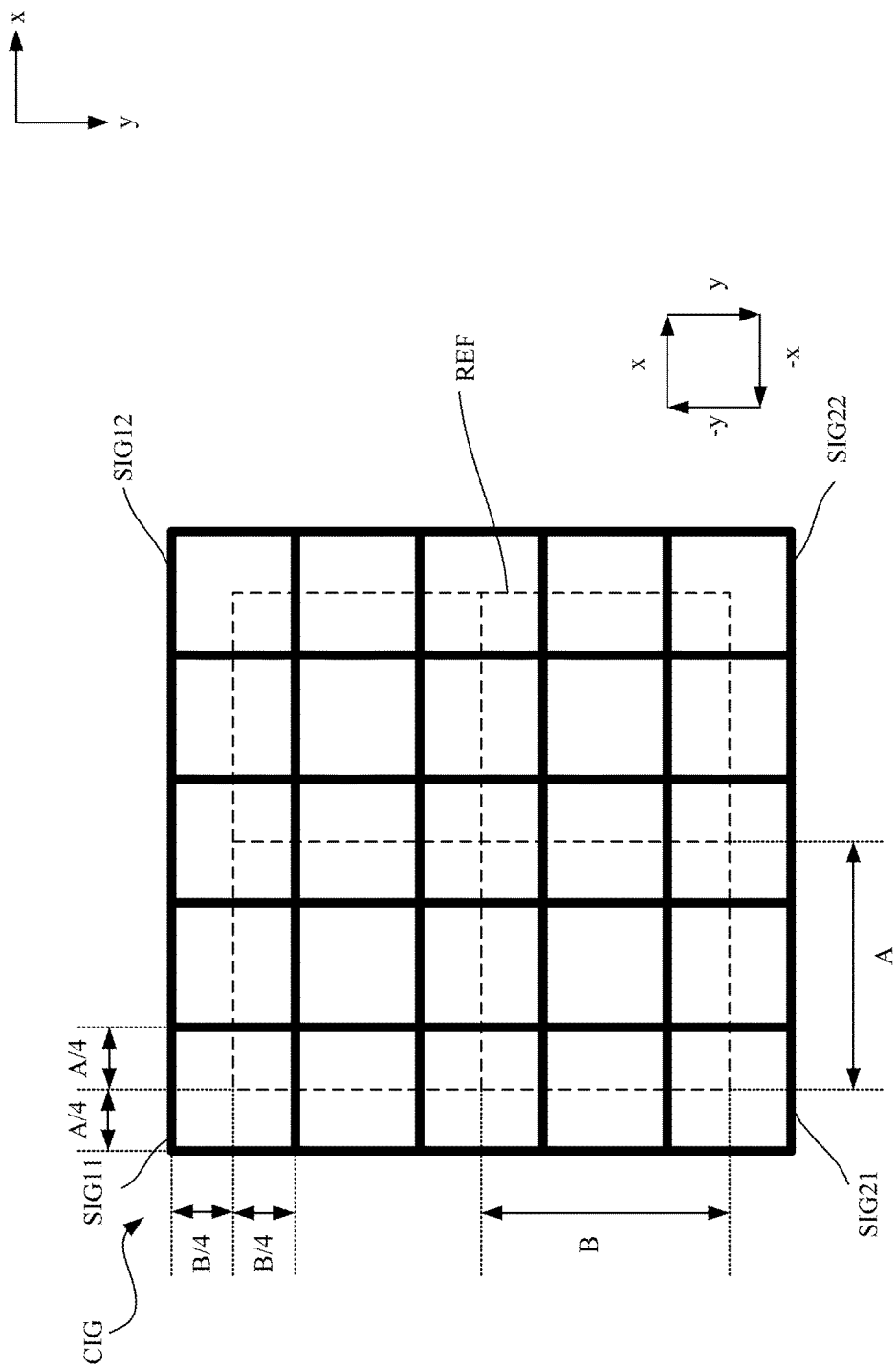
FIG. 5B illustrates a combined image in accordance with one embodiment of the present disclosure.
Figure 5D:
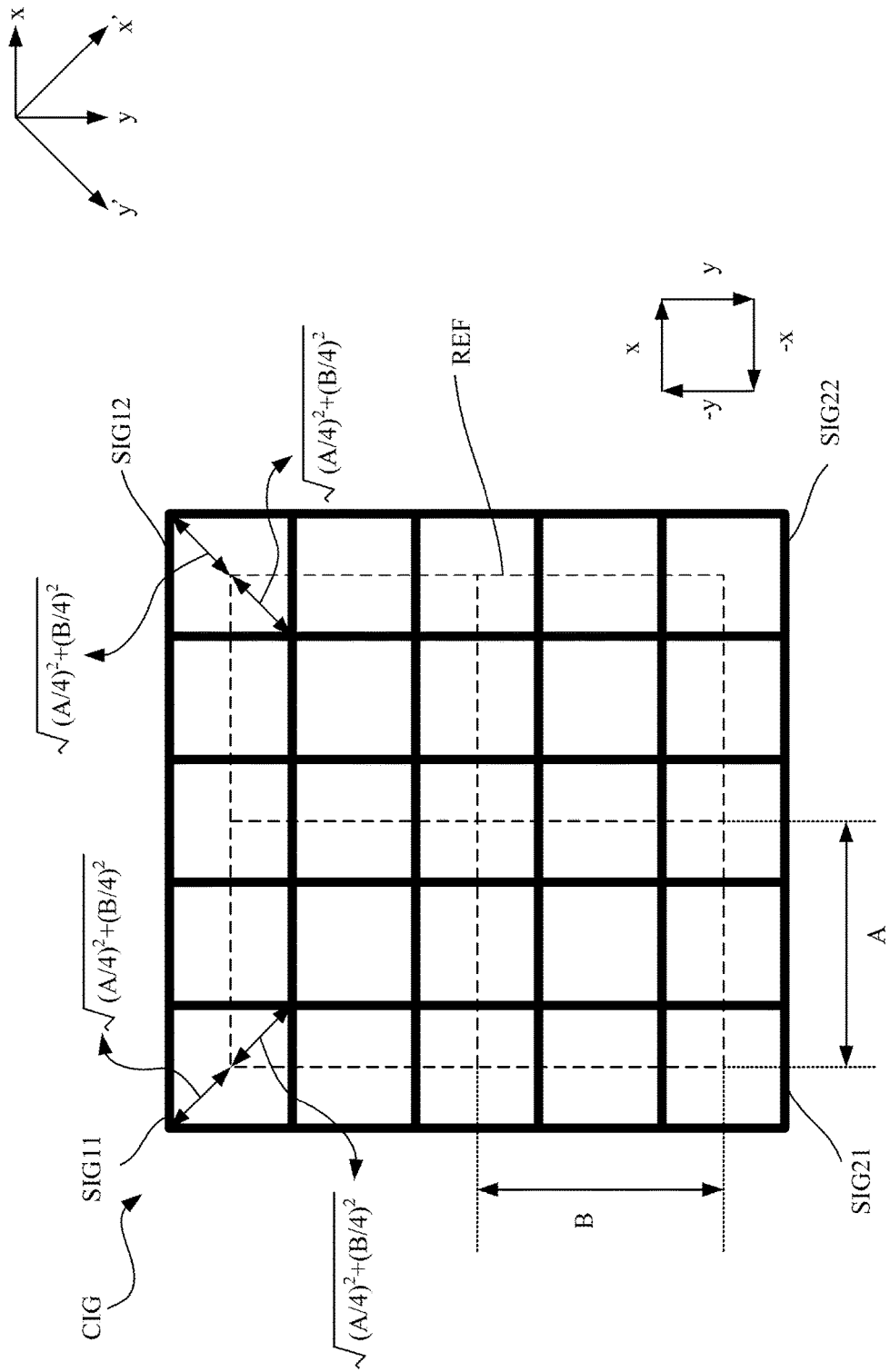
FIG. 5D illustrates a combined image in accordance with one embodiment of the present disclosure.
Figure 5E:
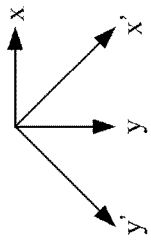
FIG. 5E illustrates a comparison between operations of the actuators in the image shift devices in FIGS. 5A and 5C in accordance with one embodiment of the present disclosure.
Figure 5E:
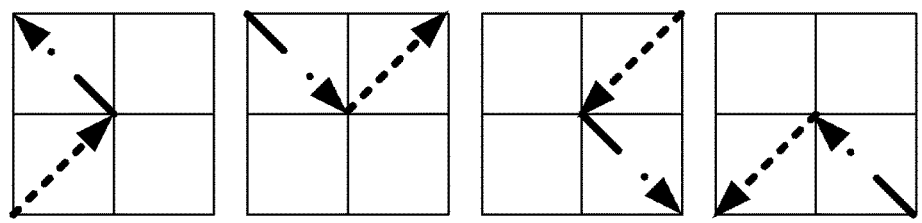
Figure 5E:
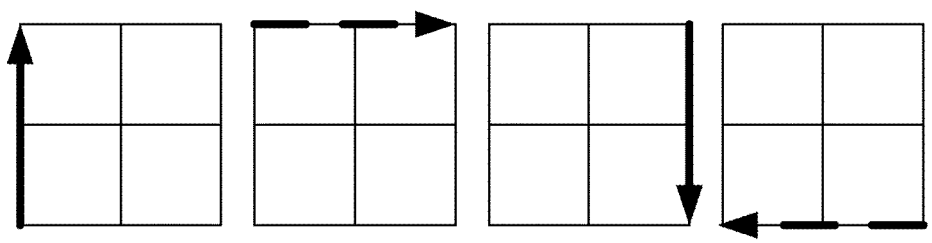

FIG. 5E illustrates a comparison between operations of the actuators in the image shift devices in FIGS. 5A and 5C in accordance with one embodiment of the present disclosure. In the embodiment that the actuators move along the x direction and the y direction (e.g., shown in FIG. 5A), only one actuator operates at a time, and the operating actuator shifts the corresponding sub-image from the reference position REF by a length of A/4 or B/4. For example, when a sub-image shifted to the first position located at the top-left side of the reference position REF is converted to another sub-image shifted to the second position located at the top-right side of the reference position REF, the two images are shifted from each other along the x direction by a length of A/2 by the actuator corresponding to the x direction. During the time that the actuator corresponding to the x direction moves the image shift device 150, the actuator corresponding to the y direction does not operate. Similarly, when a sub-image shifted to the second position located at the top-right side of the reference position REF is converted to another sub-image shifted to the third position located at the bottom-right side of the reference position REF, the two sub-images are shifted from each other along the y direction by a length of B/2 by the actuator corresponding to the y direction. During the time that the actuator corresponding to the y direction moves the image shift device 150, the actuator corresponding to the x direction does not operate. That is, in the embodiment that the actuators move along the x direction and the y direction, the two actuators do not operate at the same time. In the embodiment that the actuators move along the x' direction and the y' direction (e.g., shown in FIG. 5C), the two actuators operate at the same time, and the two operating actuators shift the corresponding sub-image from the reference position REF separately along the x' direction and the y' direction by lengths of $$\sqrt{\frac{A^2}{16} + \frac{B^2}{16}}.$$

For example, when a sub-image shifted to the first position located at the top-left side of the reference position REF is converted to another sub-image shifted to the second position located at the top-right side of the reference position REF, the actuator corresponding to the x' direction shifts the corresponding sub-image along the +x' direction by a length of $$\sqrt{\frac{A^2}{16} + \frac{B^2}{16}},$$

and the actuator corresponding to the y' direction shifts the corresponding sub-image along the −y' direction by a length of $$\sqrt{\frac{A^2}{16} + \frac{B^2}{16}}.$$

In summary, the two sub-images respectively shifted to the first position and the second position are shifted from each other along the +x direction by a length of A/2 by the two actuators. Similarly, when a sub-image shifted to the second position located at the top-right side of the reference position REF is converted to another sub-image shifted to the third position located at the bottom-right side of the reference position REF, the actuator corresponding to the x' direction shifts the corresponding sub-image along the −x' direction by a length of $$\sqrt{\frac{A^2}{16} + \frac{B^2}{16}},$$

and the actuator corresponding to the y' direction shifts the corresponding sub-image along the +y' direction by a length of $$\sqrt{\frac{A^2}{16} + \frac{B^2}{16}}.$$

In summary, the two sub-images respectively shifted to the second position and the third position are shifted from each other along the +y direction by a length of B/2 by the two actuators.

In the following paragraphs, details of the present disclosure will be provided with reference to the embodiment in FIGS. 6A and 6B, but the present disclosure is not limited to the embodiment below.

In this embodiment, the image control device 120 may receive left-eye image data LIMD and right-eye sub-image data RIMD with a fundamental frequency (e.g., 60 Hz), and temporarily store the left-eye image data LIMD and the right-eye sub-image data RIMD into the storage device 130. After both of the left-eye image data LIMD and the right-eye sub-image data RIMD have been received, the image control device 120 may load the left-eye image data LIMD and the right-eye sub-image data RIMD from the storage device 130 with two times the fundamental frequency (e.g., 120 Hz), and sequentially generate left-eye sub-image data LSBD11, LSBD12 and right-eye sub-image data RSBD22, RSBD21 with four times the fundamental frequency (e.g., 240 Hz) according to the loaded left-eye image data LIMD and right-eye sub-image data RIMD. The display device 140 may generate left-eye sub-images LSIG11, LSIG12, and right-eye sub-images RSIG22, RSIG21 with four times the fundamental frequency (e.g., 240 Hz) according to the left-eye sub-image data LSBD11, LSBD12 and the right-eye sub-image data RSBD22, RSBD21, sequentially. It should be noted that details of the generation of the left-eye sub-image data LSBD11, LSBD12 and the right-eye sub-image data RSBD22, RSBD21 can be ascertained with reference to the embodiments shown in FIGS. 3A and 3B, and a description in this regard will not be repeated herein.

In this embodiment, the image control device 120 may provide an x-direction control signal AH (e.g., with a frequency of 60 Hz) to the image shift device 150 to control the image shift device 150 to shift the sub-images LSIG11, LSIG12, RSIG22, RSIG21 along the x direction. In addition, the image control device 120 may provide a y-direction control signal AV (e.g., with a frequency of 60 Hz) to the image shift device 150 to control the image shift device 150 to shift the sub-images LSIG11, LSIG12, RSIG22, RSIG21 along the y-direction. Moreover, the image control device 120 may provide a synchronization signal SYNC to 3D glasses (not shown) to allow the 3D glasses to selectively shield a left-eye glass and a right-eye glass. In this embodiment, the frequencies of the x-direction control signal AH and the y-direction control signal AV are identical, and the phases of the x-direction control signal AH and the y-direction control signal AV are different (e.g., with a 90-degree difference). The frequencies and the phases of the synchronization signal SYNC and the y-direction control signal AV are identical.

In this embodiment, the image shift device 150 shifts the left-eye sub-image LSIG11 to a first position at a top-left side of the reference position REF, shifts the left-eye sub-image LSIG12 to a second position at a top-right side of the reference position REF, shifts the right-eye sub-image RSIG22 to a third position at a bottom-right side of the reference position REF, and shifts the sub-image RSIG21 to a fourth position at a bottom-left side of the reference position REF according to the x-direction control signal AH and the y-direction control signal AV.

More particularly, the image shift device 150 shifts the left-eye sub-image LSIG11 from the reference position REF along the −x direction by a length of A/4 and along the −y direction by a length of B/4, shifts the left-eye sub-image LSIG12 from the reference position REF along the +x direction by a length of A/4 and along the −y direction by a length of B/4, shifts the right-eye sub-image RSIG21 from the reference position REF along the −x direction by a length of A/4 and along the +y direction by a length of B/4, and shifts the right-eye sub-image RSIG22 from the reference position REF along the +x direction by a length of A/4 and along the +y direction by a length of B/4. The length A is a length of each of the pixels in the x direction. The length B is a length of each of the pixels in the y direction. In one embodiment, the left-eye sub-images LSIG11, LSIG12 are shifted from each other along the x direction, the left-eye sub-image LSIG12 and the right-eye sub-image RSIG22 are shifted from each other along the y direction, the right-eye sub-images RSIG22, RSIG21 are shifted from each other along the x direction, and the right-eye sub-image RSIG21 and the left-eye sub-image LSIG11 are shifted from each other along the y direction. In other words, the sub-images LSIG11, LSIG12, RSIG22, RSIG21 are sequentially displayed and shifted in a clockwise direction. It should be noted that although two actuators respectively configured to shift the sub-images in the x direction and the y direction are used in this embodiment, the present disclosure is not limited to this embodiment. One skilled in the art can also use two actuators to shift the sub-images in the x' direction and the y' direction by lengths of $$\sqrt{\frac{A^2}{16} + \frac{B^2}{16}}$$

with reference to the embodiment in FIGS. 5C and 5D, so that the sub-images can be shifted along the x direction and the y direction likewise.

Through the operations described above, the left-eye sub-images LSIG11, LSIG12 can partially overlap to form a left-eye combined image LCIG with a resolution greater than the resolutions of the left-eye sub-images LSIG11, LSIG12. The right-eye sub-images RSIG22, RSIG21 can partially overlap to form a right-eye combined image RCIG with a resolution greater than the resolutions of the right-eye sub-images RSIG22, RSIG21.

Figure 6A:
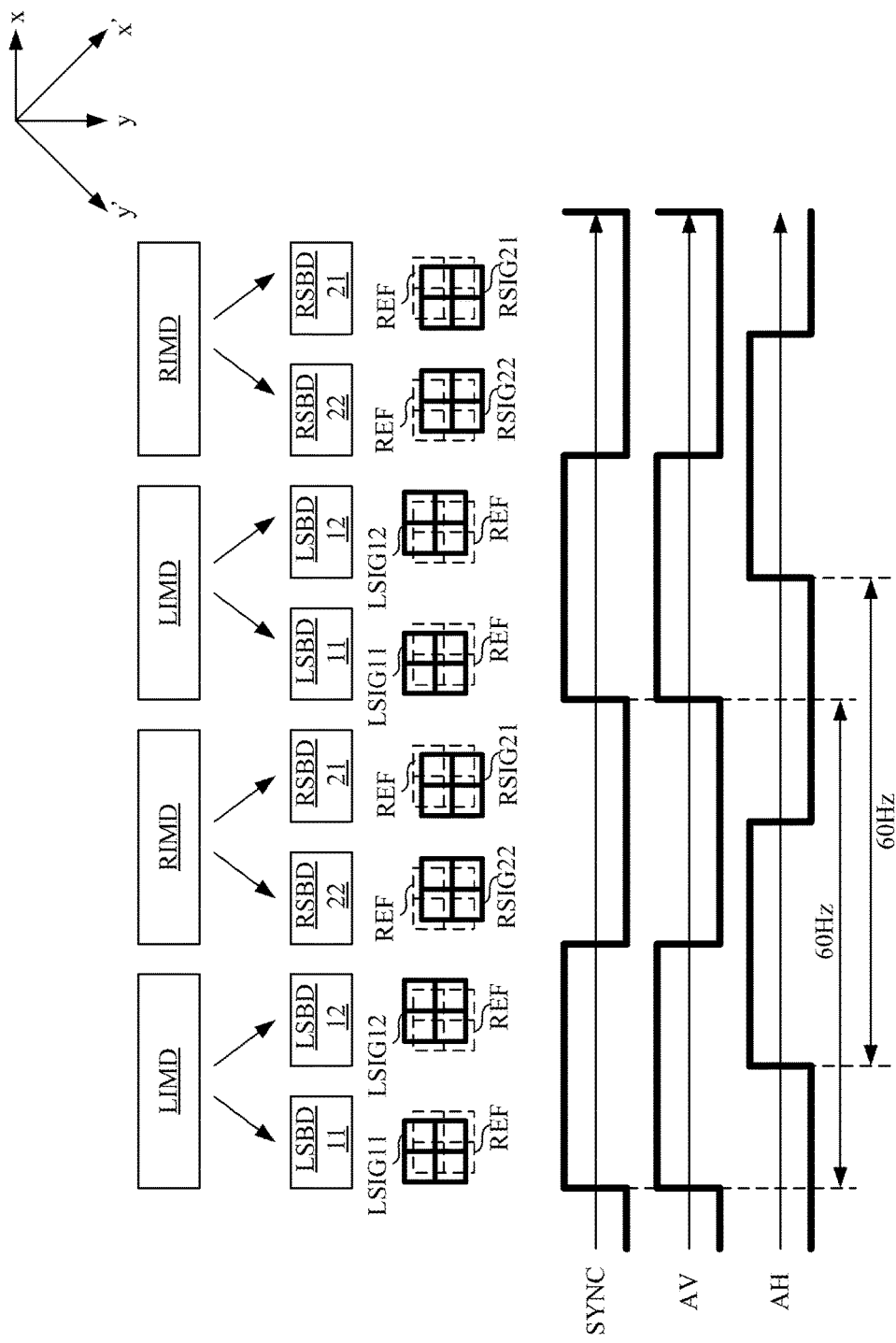
FIG. 6A illustrates a diagram used to describe shifting sub-images in accordance with one embodiment of the present disclosure.
Figure 6B:
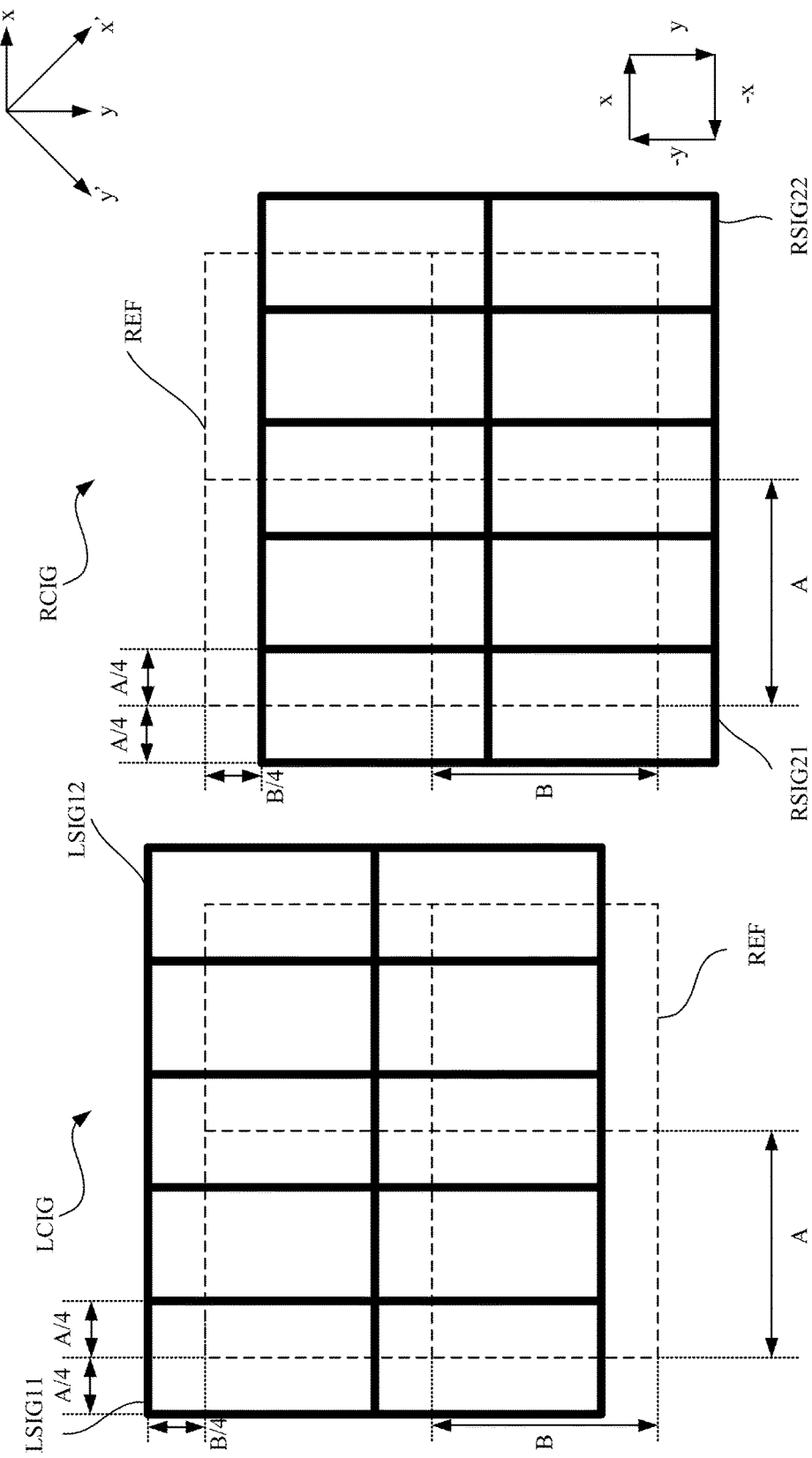
FIG. 6B illustrates a combined image in accordance with one embodiment of the present disclosure.

It should be noted that, in FIGS. 6A and 6B, the resolutions of the left-eye sub-images LSIG11, LSIG12 and right-eye sub-images RSIG22, RSIG21, which are equal to 2*2, are given for illustrative purposes, and the present disclosure is not limited to the embodiments described above. In one embodiment, if the resolution of the left-eye image data LIMD is equal to 3840*2160, then the resolutions of the left-eye sub-image data LSBD11, LSBD12 and the left-eye sub-images LSIG11, LSIG12 are equal to 1920*1080, and the resolution of the left-eye combined image LCIG is substantially equal to 3840*2160. If the resolution of the right-eye image data RIMD is equal to 3840*2160, then the resolutions of the right-eye sub-image data RSBD21, RSBD22 and the right-eye sub-images RSIG21, RSIG22 are equal to 1920*1080, and the resolution of the right-eye combined image RCIG is substantially equal to 3840*2160.

It should be noted that the left-eye combined image LCIG is combined by the left-eye sub-images LSIG11, LSIG12 shifted merely in the x direction and the right-eye combined image RCIG is combined by the right-eye sub-images RSIG21, RSIG22 shifted merely in the x direction. Thus, in one embodiment, the y-direction control signal AV provided by the image control device 120 to the image shift device 150 can be emitted without affecting the display result.

In the following paragraphs, details of the present disclosure will be provided with reference to the embodiment in FIGS. 7A and 7B, but the present disclosure is not limited to the embodiment below.

In this embodiment, the image control device 120 may receive left-eye image data LIMD and right-eye sub-image data RIMD with a fundamental frequency (e.g., 60 Hz), and temporarily store the left-eye image data LIMD and the right-eye sub-image data RIMD into the storage device 130. After both of the left-eye image data LIMD and the right-eye sub-image data RIMD have been received, the image control device 120 may load the left-eye image data LIMD and the right-eye sub-image data RIMD from the storage device 130 with two times the fundamental frequency (e.g., 120 Hz), and sequentially generate left-eye sub-image data LSBD11, LSBD22 and right-eye sub-image data RSBD21, RSBD12 with four times the fundamental frequency (e.g., 240 Hz) according to the loaded left-eye image data LIMD and right-eye sub-image data RIMD. The display device 140 may generate left-eye sub-images LSIG11, LSIG22, and right-eye sub-images RSIG21, RSIG12 with four times the fundamental frequency (e.g., 240 Hz) according to the left-eye sub-image data LSBD11, LSBD22 and the right-eye sub-image data RSBD21, RSBD12, sequentially. It should be noted that details of the generation of the left-eye sub-image data LSBD11, LSBD22 and the right-eye sub-image data RSBD21, RSBD12 can be ascertained with reference to the embodiments shown in FIGS. 3A and 3B, and a description in this regard will not be repeated herein.

In this embodiment, the image control device 120 may provide an x-direction control signal AH (e.g., with a frequency of 120 Hz) to the image shift device 150 to control the image shift device 150 to shift the sub-images LSIG11, LSIG22, RSIG21, RSIG12 along the x direction. In addition, the image control device 120 may provide a y-direction control signal AV (e.g., with a frequency of 60 Hz) to the image shift device 150 to control the image shift device 150 to shift the sub-images LSIG11, LSIG22, RSIG21, RSIG12 along the y-direction. Moreover, the image control device 120 may provide a synchronization signal SYNC to 3D glasses (not shown) to allow the 3D glasses to selectively shield a left-eye glass and a right-eye glass. In this embodiment, the frequencies of the x-direction control signal AH and the y-direction control signal AV are different, and the phases of the x-direction control signal AH and the y-direction control signal AV are different. The frequencies of the synchronization signal SYNC and the y-direction control signal AV are identical, and the phases of the synchronization signal SYNC and the y-direction control signal AV are different (e.g., with a 90-degree difference).

In this embodiment, the image shift device 150 shifts the left-eye sub-image LSIG11 to a first position at a top-left side of the reference position REF, shifts the left-eye sub-image LSIG22 to a second position at a bottom-right side of the reference position REF, shifts the right-eye sub-image RSIG21 to a third position at a bottom-left side of the reference position REF, and shifts the sub-image RSIG21 to a fourth position at a top-right side of the reference position REF according to the x-direction control signal AH and the y-direction control signal AV.

More particularly, the image shift device 150 shifts the left-eye sub-image LSIG11 from the reference position REF along the −x direction by a length of A/4 and along the −y direction by a length of B/4, shifts the left-eye sub-image LSIG22 from the reference position REF along the +x direction by a length of A/4 and along the +y direction by a length of B/4, shifts the right-eye sub-image RSIG21 from the reference position REF along the −x direction by a length of A/4 and along the +y direction by a length of B/4, and shifts the right-eye sub-image RSIG12 from the reference position REF along the +x direction by a length of A/4 and along the −y direction by a length of B/4. The length A is a length of each of the pixels in the x direction. The length B is a length of each of the pixels in the y direction.

In one embodiment, the left-eye sub-image LSIG11, and the right-eye sub-image RSIG12 are shifted from each other along the x direction, the right-eye sub-image RSIG12 and the left-eye sub-image LSIG22 are shifted from each other along the y direction, the left-eye sub-image LSIG22 and the right-eye sub-image RSIG21 are shifted from each other along the x direction, and the right-eye sub-image RSIG21 and the left-eye sub-image LSIG11 are shifted from each other along the y direction. In other words, the left-eye sub-images LSIG11, LSIG22 are sequentially displayed and shifted along the diagonal direction d, and the right-eye sub-images RSIG21, RSIG12 are sequentially displayed and shifted along the diagonal direction r. The diagonal direction d is different from the diagonal direction r. Both of the diagonal directions d and r can be composed by an x-direction component and a y-direction component.

Through the operations described above, the left-eye sub-images LSIG11, LSIG22 can partially overlap to form a left-eye combined image LCIG with a resolution greater than the resolutions of the left-eye sub-images LSIG11, LSIG22. The right-eye sub-images RSIG21, RSIG12 can partially overlap to form a right-eye combined image RCIG with a resolution greater than the resolutions of the right-eye sub-images RSIG21, RSIG12.

Figure 7A:
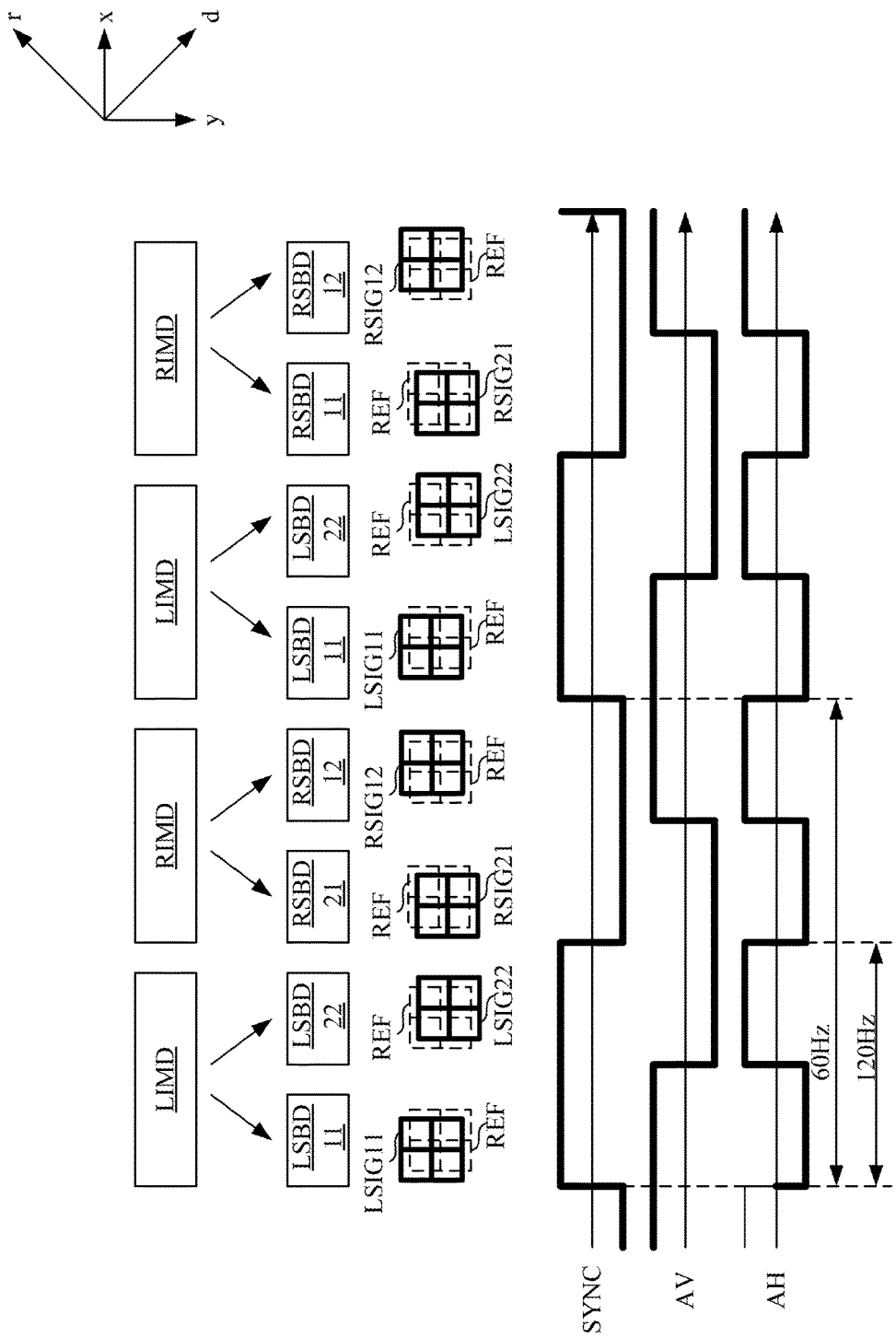
FIG. 7A illustrates a diagram used to describe shifting sub-images in accordance with one embodiment of the present disclosure.
Figure 7B:
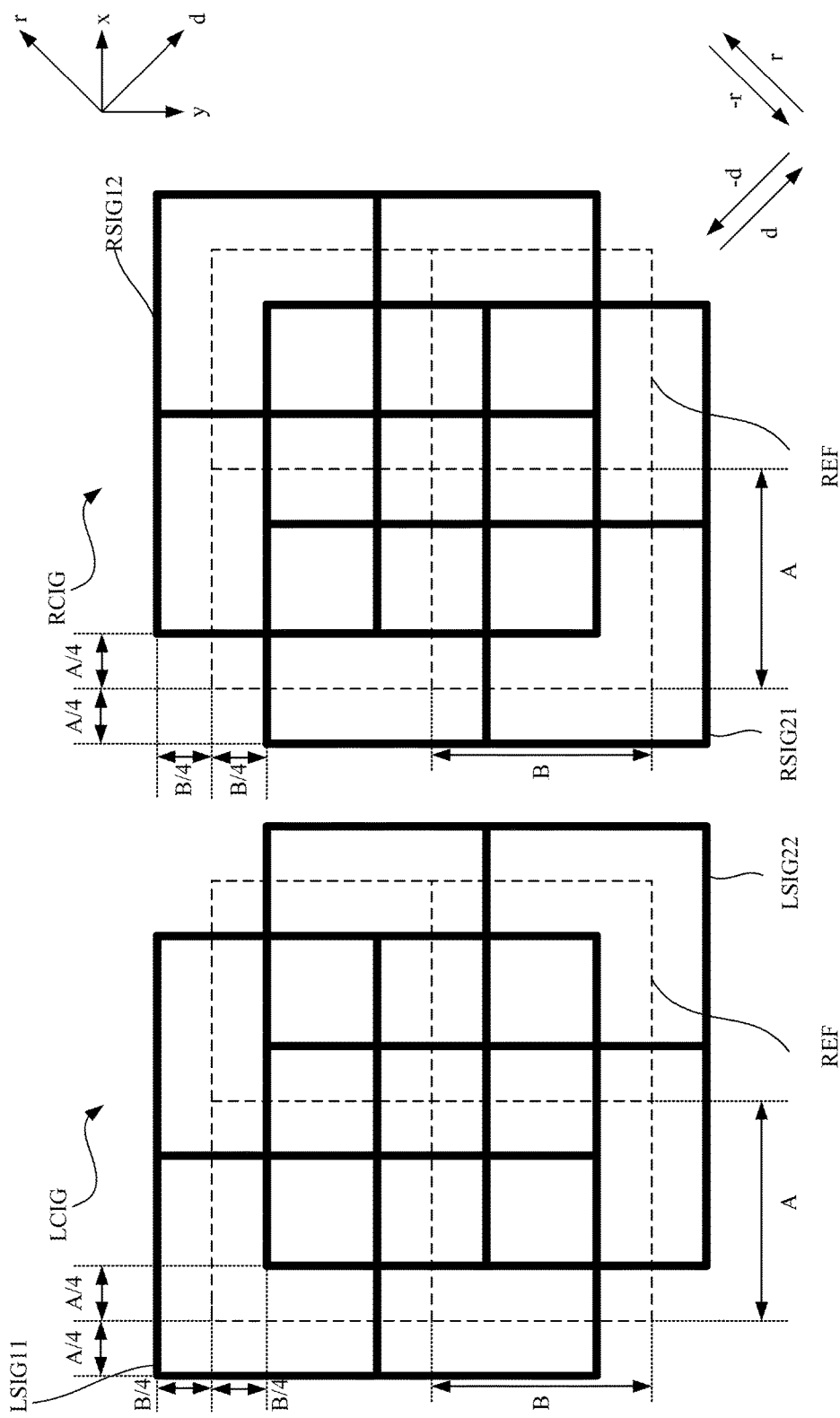
FIG. 7B illustrates a combined image in accordance with one embodiment of the present disclosure.

It should be noted that, in FIGS. 7A and 7B, the resolutions of the left-eye sub-images LSIG11, LSIG22 and the right-eye sub-images RSIG21, RSIG12, which are equal to 2*2, are given for illustrative purposes, and the present disclosure is not limited to the embodiments described above. In one embodiment, if the resolution of the left-eye image data LIMD is equal to 3840*2160, then the resolutions of the left-eye sub-image data LSBD11, LSBD22 and the left-eye sub-images LSIG11, LSIG22 are equal to 1920*1080, and the resolution of the left-eye combined image LCIG is substantially equal to 3840*2160. If the resolution of the right-eye image data RIMD is equal to 3840*2160, then the resolutions of the right-eye sub-image data RSBD21, RSBD12 and the right-eye sub-images RSIG21, RSIG12 are equal to 1920*1080, and the resolution of the right-eye combined image RCIG is substantially equal to 3840*2160. It should be noted that although two actuators respectively configured to shift the sub-images in the x direction and the y direction are used in this embodiment, the present disclosure is not limited to this embodiment. One skilled in the art can also use two actuators to shift the sub-images in the x' direction and the y' direction by lengths of $$\sqrt{\frac{A^2}{16} + \frac{B^2}{16}}$$

with reference to the embodiment in FIGS. 5C and 5D, so that the sub-images can be shifted along the x direction and the y direction likewise.

In the following paragraphs, details of the present disclosure will be provided with reference to the embodiment in FIGS. 8A and 8B, but the present disclosure is not limited to the embodiment below.

In this embodiment, the image control device 120 may receive left-eye image data LIMD and right-eye sub-image data RIMD with a fundamental frequency (e.g., 48 Hz), and temporarily store the left-eye image data LIMD and the right-eye sub-image data RIMD into the storage device 130. After both of the left-eye image data LIMD and the right-eye sub-image data RIMD have been received, the image control device 120 may load the left-eye image data LIMD and the right-eye sub-image data RIMD from the storage device 130 with three times the fundamental frequency (e.g., 144 Hz), and sequentially generate left-eye sub-image data LSBD11, LSBD22 and right-eye sub-image data RSBD11, RSBD22 with sixth times the fundamental frequency (e.g., 288 Hz) according to the loaded left-eye image data LIMD and right-eye sub-image data RIMD. The display device 140 may generate left-eye sub-images LSIG11, LSIG22, and right-eye sub-images RSIG11, RSIG22 with sixth times the fundamental frequency (e.g., 288 Hz) according to the left-eye sub-image data LSBD11, LSBD22 and the right-eye sub-image data RSBD11, RSBD22, sequentially. It should be noted that details of the generations of the left-eye sub-image data LSBD11, LSBD22 and the right-eye sub-image data RSBD11, RSBD22 can be ascertained with reference to the embodiments shown in FIGS. 3A and 3B, and a description in this regard will not be repeated herein.

In this embodiment, the image control device 120 may provide a diagonal direction control signal AD (e.g., with a frequency of 144 Hz) to the image shift device 150 to control the image shift device 150 to shift the sub-images LSIG11, LSIG22, RSIG11, RSIG22 along the direction d. In addition, the image control device 120 may provide a synchronization signal SYNC (e.g., with a frequency of 72 Hz) to 3D glasses (not shown) to allow the 3D glasses to selectively shield a left-eye glass and a right-eye glass. In this embodiment, the frequencies of the diagonal direction control signal AD and the synchronization signal SYNC are different.

In this embodiment, the image shift device 150 shifts the left-eye sub-image LSIG11 to a first position at a top-left side of the reference position REF, shifts the left-eye sub-image LSIG22 to a second position at a bottom-right side of the reference position REF, shifts the right-eye sub-image RSIG11 to a third position at a top-left side of the reference position REF, and shifts the sub-image RSIG22 to a fourth position at a bottom-right side of the reference position REF according to the diagonal direction control signal AD. The first position and the third position are identical. The second position and the fourth position are identical.

More particularly, the image shift device 150 shifts the left-eye sub-image LSIG11 from the reference position REF along the −x direction by a length of A/4 and along the −y direction by a length of B/4, shifts the left-eye sub-image LSIG22 from the reference position REF along the +x direction by a length of A/4 and along the +y direction by a length of B/4, shifts the right-eye sub-image RSIG11 from the reference position REF along the −x direction by a length of A/4 and along the −y direction by a length of B/4, and shifts the right-eye sub-image RSIG22 from the reference position REF along the +x direction by a length of A/4 and along the +y direction by a length of B/4. The length A is a length of each of the pixels in the x direction. The length B is a length of each of the pixels in the y direction.

In one embodiment, the left-eye sub-images LSIG11, LSIG22 are sequentially displayed and shifted along the diagonal direction d, and the right-eye sub-images RSIG11, RSIG22 are sequentially displayed and shifted along the diagonal direction d. Both of the diagonal directions d and r can be composed by an x-direction component and a y-direction component.

Through the operations described above, the left-eye sub-images LSIG11, LSIG22 can partially overlap to form a left-eye combined image LCIG with a resolution greater than the resolutions of the left-eye sub-images LSIG11, LSIG22. Moreover, the right-eye sub-images RSIG11, RSIG22 can partially overlap to form a right-eye combined image RCIG with a resolution greater than the resolutions of the right-eye sub-images RSIG11, RSIG22.

Figure 8A:
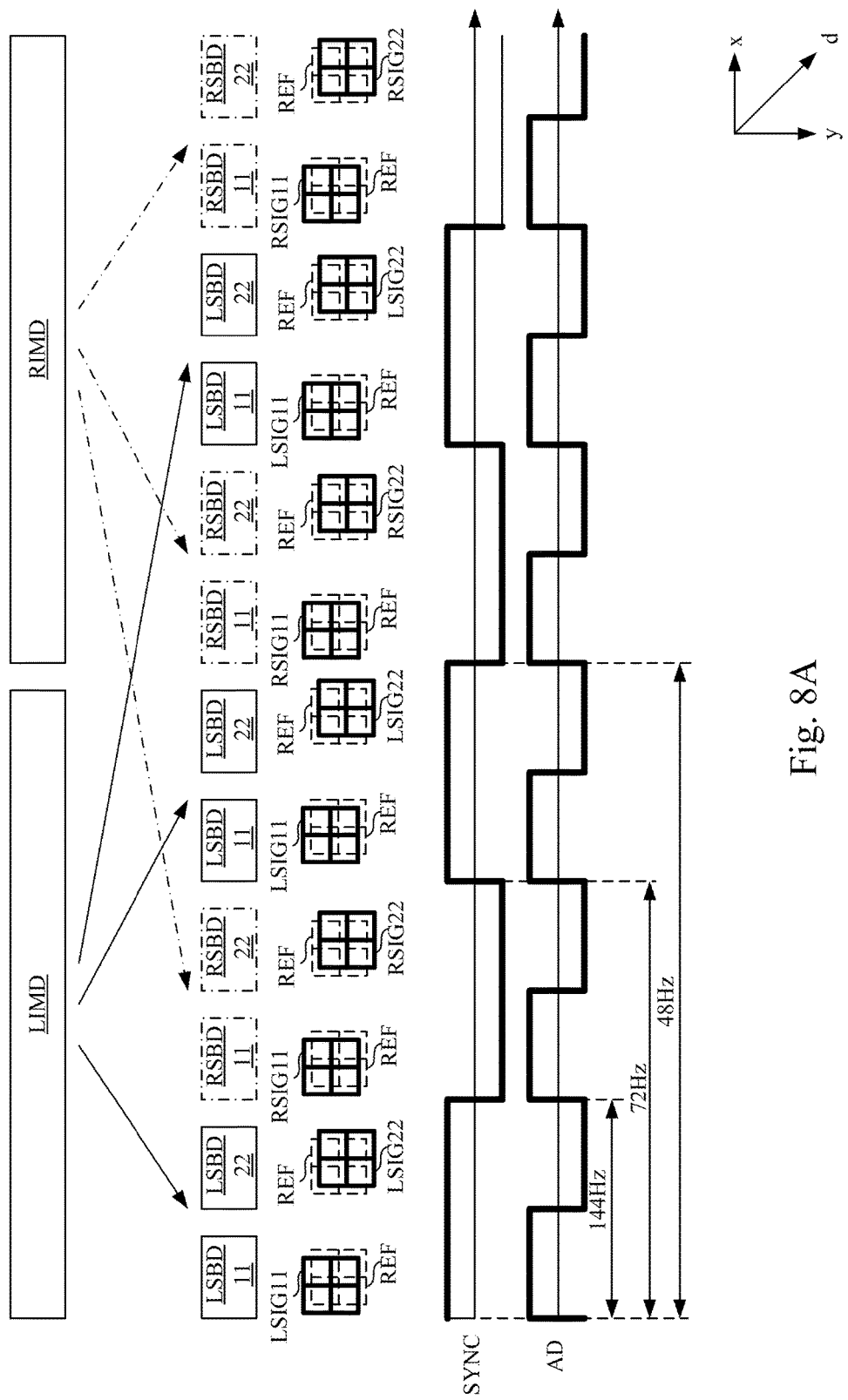
FIG. 8A illustrates a diagram used to describe shifting sub-images in accordance with one embodiment of the present disclosure.
Figure 8B:
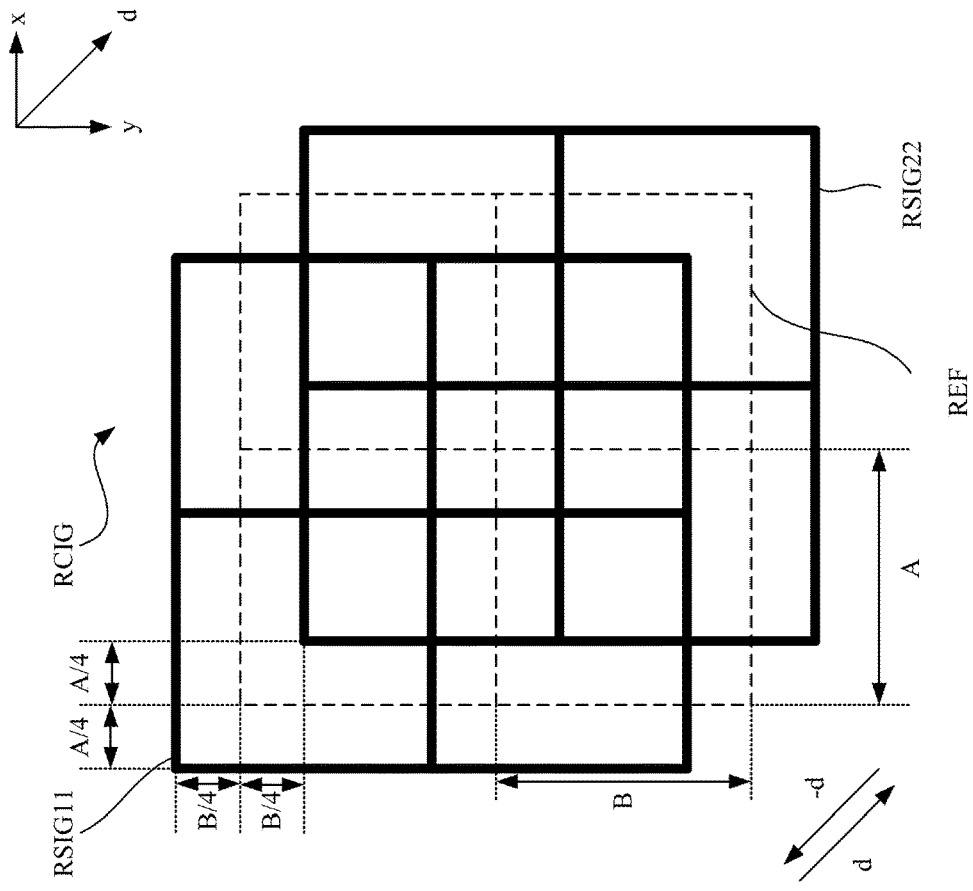
FIG. 8B illustrates a combined image in accordance with one embodiment of the present disclosure.

It should be noted that, in FIGS. 8A and 8B, the resolutions of the left-eye sub-images LSIG11, LSIG22 and the right-eye sub-images RSIG11, RSIG22, which are equal to 2*2, are given for illustrative purposes, and the present disclosure is not limited to the embodiments described above. In one embodiment, if the resolution of the left-eye image data LIMD is equal to 3840*2160, then the resolutions of the left-eye sub-image data LSBD11, LSBD22 and the left-eye sub-images LSIG11, LSIG22 are equal to 1920*1080, and the resolution of the left-eye combined image LCIG is substantially equal to 3840*2160. If the resolution of the right-eye image data RIMD is equal to 3840*2160, then the resolutions of the right-eye sub-image data RSBD11, RSBD22 and the right-eye sub-images RSIG11, RSIG22 are equal to 1920*1080, and the resolution of the right-eye combined image RCIG is substantially equal to 3840*2160.

By generating the left-eye sub-images LSIG11, LSIG22 and the right-eye sub-images RSIG11, RSIG22 with sixth times the fundamental frequency (e.g., 288 Hz), flicker caused by a low fundamental frequency can be avoided.

Although the present invention has been described in considerable detail with reference to certain embodiments thereof, other embodiments are possible. Therefore, the scope of the appended claims should not be limited to the description of the embodiments contained herein.

What is claimed is:

1. A 3D projection apparatus comprising:
    an image control device configured to generate a plurality of left-eye sub-image data according to a left-eye image data and generate a plurality of right-eye sub-image data according to a right-eye image data;
    a display device configured to sequentially receive the plurality of left-eye sub-image data and the plurality of right-eye sub-image data, and sequentially display a plurality of left-eye sub-images and a plurality of right-eye sub-images according to the left-eye sub-image data and the right-eye sub-image data respectively;
    an image shift device configured to shift the left-eye sub-images from each other and shift the right-eye sub-images from each other, wherein the shifted left-eye sub-images form a left-eye combined image, the shifted right-eye sub-images form a right-eye combined image, a resolution of the left-eye combined image is greater than resolutions of the left-eye sub-images, and a resolution of the right-eye combined image is greater than resolutions of the right-eye sub-images; and
    a projection device configured to project the shifted left-eye sub-images and the shifted right-eye sub-images onto a projection screen.

2. The 3D projection apparatus as claimed in claim 1, wherein the left-eye sub-images comprise a first left-eye sub-image and a second left-eye sub-image, the right-eye sub-images comprise a first right-eye sub-image and a second right-eye sub-image, the image shift device shifts the first left-eye sub-image and the second left-eye sub-image from each other along a first direction, and the image shift device shifts the first right-eye sub-image and the second right-eye sub-image from each other along the first direction.

3. The 3D projection apparatus as claimed in claim 2, wherein the image shift device shifts the second left-eye sub-image and the first right-eye sub-image from each other along a second direction different from the first direction.

4. The 3D projection apparatus as claimed in claim 3, wherein the image shift device is controlled by a first direction control signal generated by the image control device to shift the first left-eye sub-image and the second left-eye sub-image along the first direction and shift the first right-eye sub-image and the second right-eye sub-image along the first direction,
    the image shift device is controlled by a second direction control signal generated by the image control device to shift the second left-eye sub-image and the first right-eye sub-image along the second direction,
    frequencies of the first direction control signal and the second direction control signal are identical, and phases of the first direction control signal and the second direction control signal are different.

5. The 3D projection apparatus as claimed in claim 1, wherein the left-eye sub-images comprise a first left-eye sub-image and a second left-eye sub-image, the right-eye sub-images comprise a first right-eye sub-image and a second right-eye sub-image,
    the image shift device shifts the first left-eye sub-image and the second right-eye sub-image from each other along a first direction,
    the image shift device shifts the first left-eye sub-image and the first right-eye sub-image from each other along a second direction,
    and the image shift device shifts the second left-eye sub-image and the second right-eye sub-image from each other along the second direction.

6. The 3D projection apparatus as claimed in claim 5, wherein the image shift device is controlled by a first direction control signal generated by the image control device to shift the first left-eye sub-image and the second right-eye sub-image along the first direction, the image shift device is controlled by a second direction control signal generated by the image control device to shift the first left-eye sub-image and the first right-eye sub-image along the second direction and shift the second left-eye sub-image and the second right-eye sub-image along the second direction, and frequencies of the first direction control signal and the second direction control signal are different.

7. The 3D projection apparatus as claimed in claim 1, wherein the left-eye sub-images comprise a first left-eye sub-image and a second left-eye sub-image, the right-eye sub-images comprise a first right-eye sub-image and a second right-eye sub-image, the image shift device shifts the first left-eye sub-image and the second left-eye sub-image from each other along a diagonal direction, and the image shift device shifts the first right-eye sub-image and the second right-eye sub-image from each other along the diagonal direction.

8. The 3D projection apparatus as claimed in claim 7, wherein the first left-eye sub-image and the first right-eye sub-image are shifted to an identical position.

9. The 3D projection apparatus as claimed in claim 7, wherein the image control device is further configured to provide a synchronization signal to 3D glasses to selectively shield a first glass or a second glass of the 3D glasses, the image shift device is controlled by a diagonal direction control signal generated by the image control device to shift the first left-eye sub-image and the second left-eye sub-image along the diagonal direction and shift the first right-eye sub-image and the second right-eye sub-image along the diagonal direction, and frequencies of the synchronization signal and the diagonal direction control signal are different.

10. The 3D projection apparatus as claimed in claim 2, wherein the display device is configured to sequentially display the first left-eye sub-image, the second left-eye sub-image, the first right-eye sub-image, and the second right-eye sub-image.

11. A 3D projection apparatus comprising:

an image control device configured to generate a first left-eye sub-image data and a second left-eye sub-image data according to a left-eye image data, and generate a first right-eye sub-image data and a second right-eye sub-image data according to a right-eye image data, wherein the first left-eye sub-image data and the second left-eye sub-image data are different from each other, and the first right-eye sub-image data and the second right-eye sub-image data are different from each other;

a display device configured to sequentially display a first left-eye sub-image, a second left-eye sub-image, a first right-eye sub-image, and a second right-eye sub-image according to the first left-eye sub-image data, the second left-eye sub-image data, the first right-eye sub-image data, and the second right-eye sub-image data respectively;

an image shift device configured to shift the first left-eye sub-image to a first position, shift the second left-eye sub-image to a second position, shift the first right-eye sub-image to a third position, and shift the second right-eye sub-image to a fourth position, wherein the first position, the second position, the third position, and the fourth position are different from each other; and a projection device configured to project the shifted first left-eye sub-image, the shifted second left-eye sub-image, the shifted first right-eye sub-image, and the shifted second right-eye sub-image onto a projection screen.

12. The 3D projection apparatus as claimed in claim 11, wherein the first position and the second position are shifted from each other along a first direction, and the third position and the fourth position are shifted from each other along the first direction.

13. The 3D projection apparatus as claimed in claim 12, wherein the second position and the third position are shifted from each other along a second direction different from the first direction.

14. The 3D projection apparatus as claimed in claim 13, wherein the image shift device is controlled by a first direction control signal generated by the image control device to shift the first left-eye sub-image and the second left-eye sub-image along the first direction and shift the first right-eye sub-image and the second right-eye sub-image along the first direction, the image shift device is controlled by a second direction control signal generated by the image control device to shift the second left-eye sub-image and the first right-eye sub-image along the second direction, frequencies of the first direction control signal and the second direction control signal are identical, and phases of the first direction control signal and the second direction control signal are different.

15. The 3D projection apparatus as claimed in claim 11, wherein the first position and the fourth position are shifted from each other along a first direction, the first position and the third position are shifted from each other along a second direction different from the first direction, and the second position and the fourth position are shifted from each other along the second direction.

16. The 3D projection apparatus as claimed in claim 15, wherein the image shift device is controlled by a first direction control signal generated by the image control device to shift the first left-eye sub-image and the second right-eye sub-image along the first direction, the image shift device is controlled by a second direction control signal generated by the image control device to shift the first left-eye sub-image and the first right-eye sub-image along the second direction and shift the second left-eye sub-image and the second right-eye sub-image along the second direction, and frequencies of the first direction control signal and the second direction control signal are different.

17. A projection apparatus comprising:

an image control device configured to generate a plurality of sub-image data different from each other according to an image data, wherein the image data includes a plurality of pixel data, each of a plurality of adjacent pixel data of the pixel data are grouped as a pixel group, each of the sub-image data includes one of the pixel data in the pixel groups;

a display device configured to sequentially receive the sub-image data, and sequentially display a plurality of sub-images;

an image shift device configured to shift the sub-images from each other, wherein the shifted sub-images form a combined image, and a resolution of the combined image is greater than resolutions of the sub-images; and a projection device configured to project the shifted sub-images onto a projection screen.

18. The projection apparatus as claimed in claim 17, wherein a first sub-image data of the sub-image data includes a plurality of first pixel data located at a plurality of first pixel positions of each of the pixel groups, a second sub-image data of the sub-image data includes a plurality of second pixel data located at a plurality of second pixel positions of each of the pixel groups, the first pixel positions and the second pixel positions are located diagonally opposite to each other, and the display device is configured to display the sub-images according to the first sub-image data and the second sub-image data, sequentially.

19. The projection apparatus as claimed in claim 17, wherein a first sub-image data of the sub-image data includes a plurality of first pixel data located at a plurality of first pixel positions of each of the pixel groups, a second sub-image data of the sub-image data includes a plurality of second pixel data located at a plurality of second pixel positions of each of the pixel groups, a third sub-image data of the sub-image data includes a plurality of third pixel data located at a plurality of third pixel positions of each of the pixel groups, and a fourth sub-image data of the sub-image data includes a plurality of fourth pixel data located at a plurality of fourth pixel positions of each of the pixel groups, each of the first pixel positions and each of the second pixel positions are adjacent in a first direction, each of the second pixel positions and each of the third pixel positions are adjacent in a second direction, each of the third pixel positions and each of the fourth pixel positions are adjacent in the first direction, and the display device is configured to display the sub-images according to the first sub-image data, the second sub-image data, the third sub-image data, and the fourth sub-image data, sequentially.

20. The projection apparatus as claimed in claim 17, wherein a first sub-image data of the sub-image data includes a plurality of first pixel data located at a plurality of first pixel positions of each of the pixel groups, a second sub-image data of the sub-image data includes a plurality of second pixel data located at a plurality of second pixel positions of each of the pixel groups, a third sub-image data of the sub-image data includes a plurality of third pixel data located at a third pixel positions of each of the pixel groups, and a fourth sub-image data of the sub-image data includes a plurality of fourth pixel data located at a plurality of fourth pixel positions of each of the pixel groups, each of the first pixel positions and each of the second pixel positions are adjacent in a first direction, each of the fourth pixel positions and each of the second pixel positions are adjacent in a second direction, each of the second pixel position and each of the third pixel position are adjacent in the first direction, and the display device is configured to display the sub-images according to the first sub-image data, the second sub-image data, the third sub-image data, and the fourth sub-image data, sequentially.

* * * * *